US009258093B2

(12) United States Patent
Avudainayagam et al.

(10) Patent No.: US 9,258,093 B2
(45) Date of Patent: Feb. 9, 2016

(54) ESTIMATING TONE MAPS IN A COMMUNICATION NETWORK

(71) Applicant: QUALCOMM Incorporated, San Diego, CA (US)

(72) Inventors: Arun Avudainayagam, Gainesville, FL (US); Treina Cresse, Orlando, FL (US); Manjunath Anandarama Krishnam, San Jose, CA (US); Ehab Tahir, Mississauga (CA)

(73) Assignee: QUALCOMM Incorporated, San Diego, CA (US)

( * ) Notice: Subject to any disclaimer, the term of this patent is extended or adjusted under 35 U.S.C. 154(b) by 175 days.

(21) Appl. No.: 14/063,931

(22) Filed: Oct. 25, 2013

(65) Prior Publication Data
US 2015/0117229 A1    Apr. 30, 2015

(51) Int. Cl.
*H04W 4/00*      (2009.01)
*H04L 5/00*      (2006.01)
*H04B 3/46*      (2015.01)
*H04B 3/54*      (2006.01)
(Continued)

(52) U.S. Cl.
CPC ................ *H04L 5/0048* (2013.01); *H04B 3/46* (2013.01); *H04B 3/542* (2013.01); *H04B 3/544* (2013.01); *H04L 1/0026* (2013.01); *H04L 1/0029* (2013.01); *H04L 5/0094* (2013.01); *H04L 25/022* (2013.01); *H04L 25/0228* (2013.01); *H04L 43/16* (2013.01); *H04B 2203/5408* (2013.01); *H04B 2203/5445* (2013.01); *H04B 2203/5466* (2013.01); *H04L 5/0046* (2013.01)

(58) Field of Classification Search
CPC .. H04B 3/46; H04B 3/544; H04B 2203/5408; H04B 2203/5445; H04B 3/542; H04B 2203/5466; H04L 5/0048; H04L 43/16; H04L 1/0026; H04L 5/0094; H04L 25/022; H04L 25/0228; H04L 1/0029; H04L 5/0046
USPC ........................... 370/329; 455/450, 464, 509
See application file for complete search history.

(56) References Cited

U.S. PATENT DOCUMENTS 8,126,065 B2    2/2012    Iwamura
8,261,079 B2    9/2012    Newman et al.
(Continued)

OTHER PUBLICATIONS

"Narrow-band OFDM power line Communication Transceivers—G3-PLC", Oct. 29, 2012, 186 pages.
(Continued)

*Primary Examiner* — Mang Yeung
(74) *Attorney, Agent, or Firm* — DeLizio Law, PLLC

(57) ABSTRACT

A network device may be configured to iteratively modify an initial tone map for each communication region of a power-line cycle to minimize the time before application data can be transmitted. A first network device estimates an initial tone map for each communication region based, at least in part, on sounding messages received from a second network device. The first network device determines whether to estimate a modified tone map for the first communication region based on at least one performance measurement associated with a data packet generated using the initial tone map for the first communication region. If so, the second network device retransmits the sounding messages in the first communication region that will be used to modify the initial tone map for the first communication region, and the second network device continues to transmit the data packets using the initial tone maps in the remaining communication regions.

30 Claims, 8 Drawing Sheets

(51) Int. Cl.
H04L 12/26 (2006.01)
H04L 1/00 (2006.01)
H04L 25/02 (2006.01)

(56) References Cited

U.S. PATENT DOCUMENTS

| | | |
|---|---|---|
| 8,509,333 B2 | 8/2013 | Stadelmeier et al. |
| 2007/0025383 A1* | 2/2007 | Katar et al. ............ 370/442 |
| 2007/0025386 A1* | 2/2007 | Riedel et al. ............ 370/445 |
| 2008/0298382 A1 | 12/2008 | Galli et al. |
| 2010/0073149 A1* | 3/2010 | Goldfisher et al. ...... 340/310.12 |
| 2012/0257683 A1 | 10/2012 | Schwager et al. |
| 2013/0121157 A1 | 5/2013 | Logvinov et al. |

OTHER PUBLICATIONS

"PCT Application No. PCT/US2014/061893 International Search Report", Jan. 30, 2015, 12 pages.

Schneider, et al., "Precoded Spatial Multiplexing MIMO for Inhome Power Line Communications", Global Telecommunications Conference t 2008. IEEE Globecom 2008. IEEE. Piscataway, NJ, USA, Nov. 30, 2008, 5 pages.

* cited by examiner

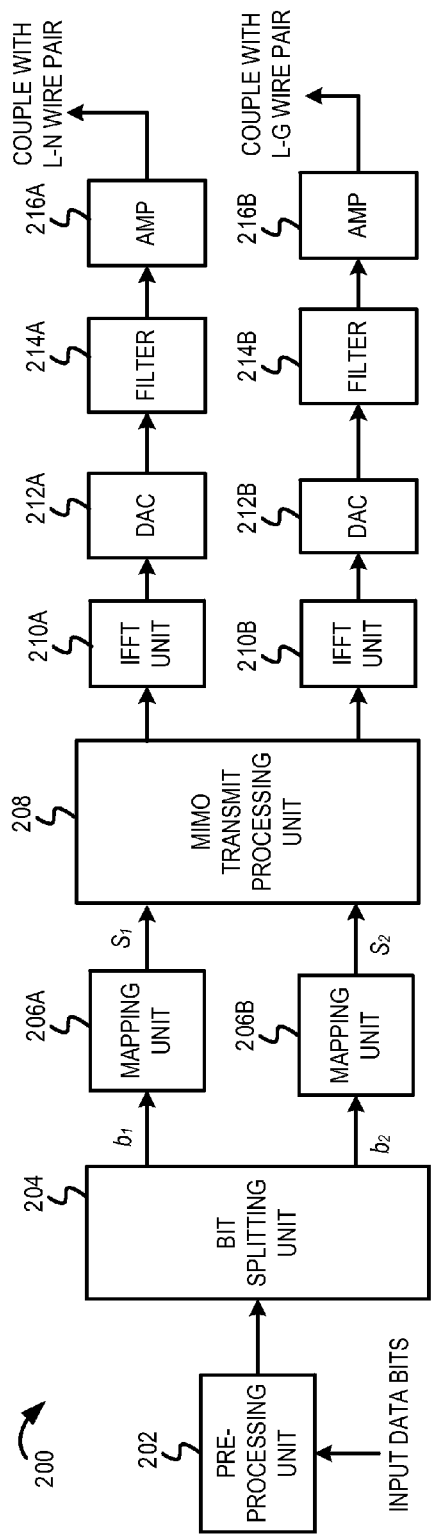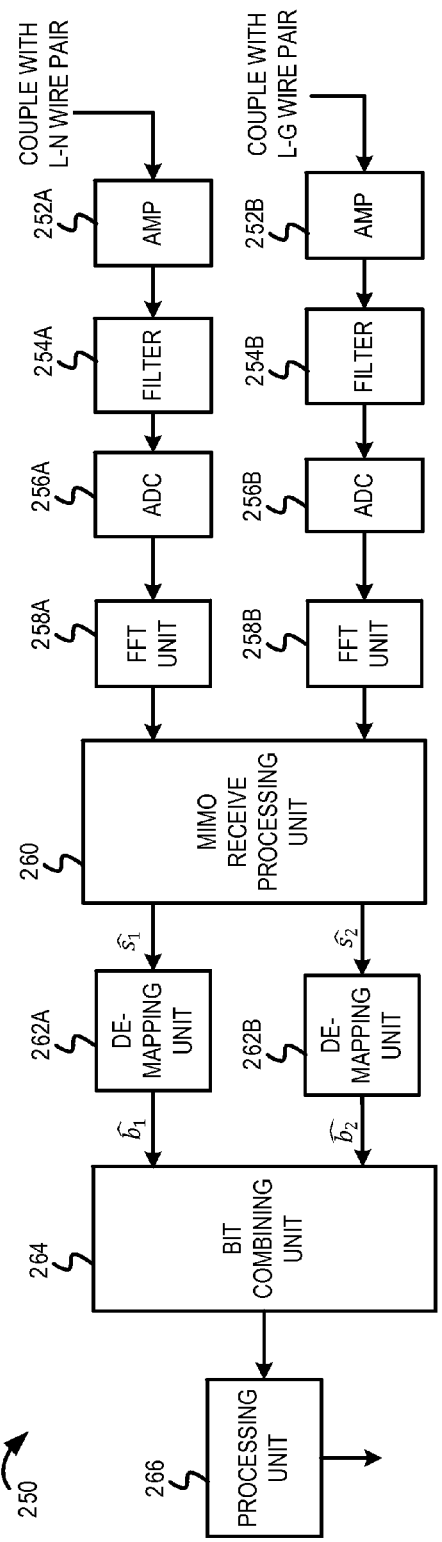
FIG. 2A
FIG. 2B

ESTIMATING TONE MAPS IN A COMMUNICATION NETWORK

BACKGROUND

Embodiments of the inventive subject matter generally relate to the field of communication networks and, more particularly, to estimating tone maps in a multiple-input multiple output (MIMO) communication network.

Electric transmission and distribution lines are typically used for providing electric power from generators to buildings, residences, and other components of a city's infrastructure. The electric power may be transmitted over the transmission lines at a high voltage, and may be distributed to buildings and other structures at much lower voltages using electric power lines. Besides providing electric power, electric power lines can also be used to implement powerline communications within buildings and other structures. Powerline communications (e.g., using HomePlug® or IEEE 1901 protocols) can provide another communication medium for interconnecting network devices. A network device may use various techniques to generate and transmit packets in a powerline communication network. For example, the network device may use tone maps to determine how to generate and transmit packets in the powerline communication network.

SUMMARY

Various embodiments are disclosed for estimating tone maps in a powerline communication network. In some embodiments, a first network device may determine initial tone maps for a plurality of communication regions of a powerline cycle associated with the powerline communication network. The first network device may determine the initial tone maps based, at least in part, on a plurality of sounding messages received from a second network device. The first network device may receive a first data packet in a first communication region of the powerline cycle. The first data packet is transmitted from the second network device using a first initial tone map associated with the first communication region. The first network device may determine whether to estimate a first modified tone map for the first communication region based, at least in part, on a first performance measurement associated with the first data packet.

BRIEF DESCRIPTION OF THE DRAWINGS

The present embodiments may be better understood, and numerous objects, features, and advantages made apparent to those skilled in the art by referencing the accompanying drawings.

FIG. 2A is a block diagram illustrating an example transmitting PLC device;

FIG. 2B is a block diagram illustrating an example receiving PLC device;

DESCRIPTION OF EMBODIMENT(S)

Figure 1:
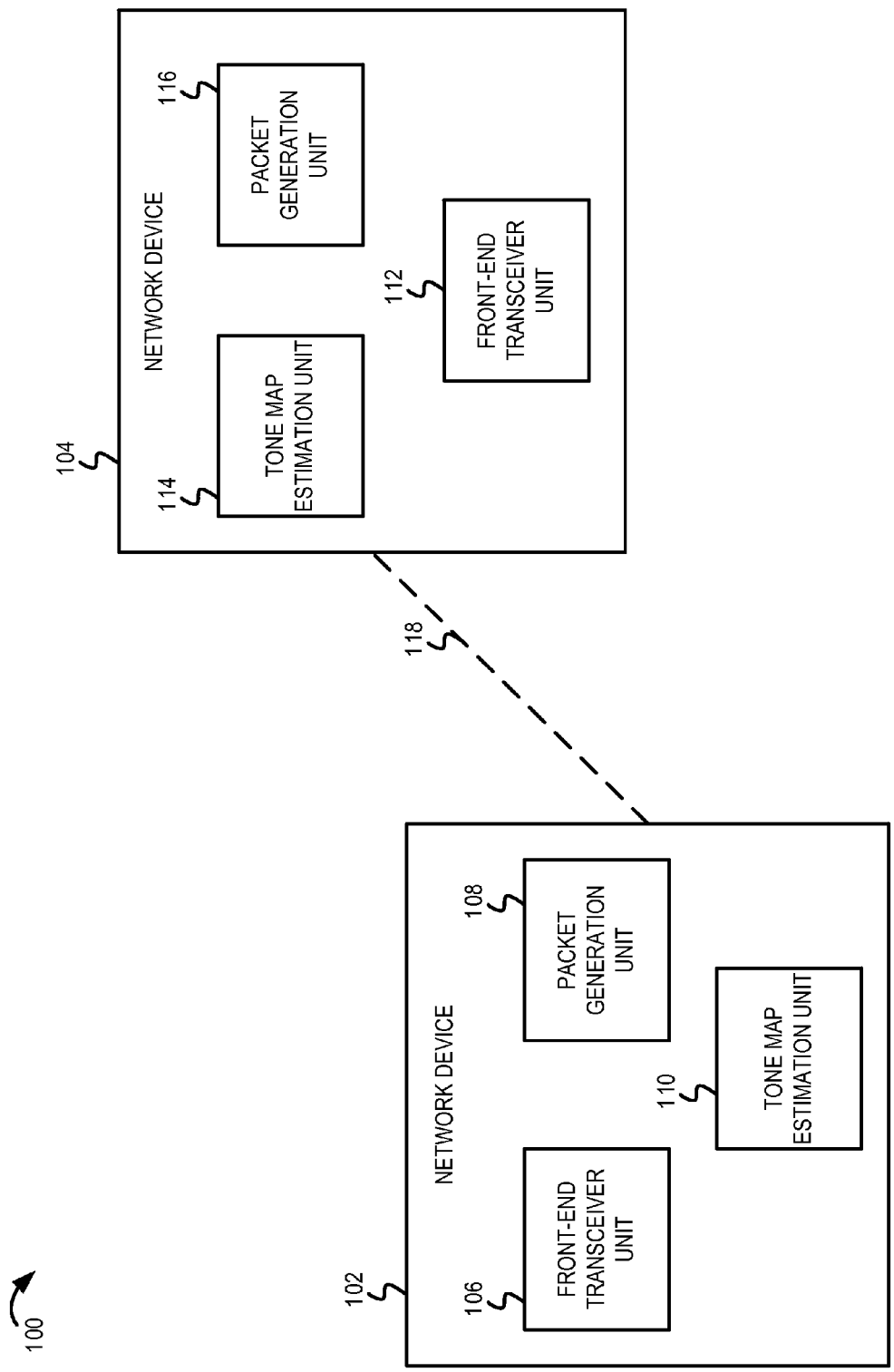
FIG. 1 is an example block diagram of a communication network including a mechanism for estimating a tone map.

The description that follows includes exemplary systems, methods, techniques, instruction sequences, and computer program products that embody techniques of the present inventive subject matter. However, it is understood that the described embodiments may be practiced without these specific details. For instance, although examples refer to estimating tone maps in a powerline communication (PLC) network (e.g., a HomePlug AV network), embodiments are not so limited. In other embodiments, operations for estimating tone maps described herein can be executed by network devices that implement other suitable communication protocols and techniques (e.g., wireless local area network (WLAN) protocols, such as IEEE 802.11 protocols, multimedia over coax alliance (MoCA) protocols, Ethernet protocols, etc.). In other instances, well-known instruction instances, protocols, structures, and techniques have not been shown in detail in order not to obfuscate the description.

To minimize channel variations and the effects of noise on a powerline communication (PLC) channel, each half of an alternating current (AC) powerline cycle (e.g., a 50 Hz or 60 Hz AC powerline signal) may be divided into multiple time intervals, referred to as "communication regions." Each communication region may have different beamforming parameters and bit loading information. The beamforming parameters and the bit loading information may be collectively referred to as a "tone map." The beamforming parameters may be determined based on channel characteristics and may be used to weight data (e.g., one or more data symbols) transmitted in a multi-steam or multi-transmitter environment to compensate for channel variations and noise. In a multi-subcarrier system (e.g., orthogonal frequency division multiplexing or OFDM system), each communication sub-carrier may be associated with beamforming parameters and bit loading information. The bit loading information can indicate how many bits can be mapped to the communication sub-carrier without a negative performance impact. Some techniques for determining different tone maps for each communication region involve evaluating each communication region separately. In one example technique, a transmitting PLC device may transmit multiple messages with predefined data in each of the communication regions of the powerline cycle (referred to as a "sounding process"). A receiving PLC device may use the sounding messages received in each communication region to estimate a different tone map for each communication region. The transmitting PLC device may use the tone maps associated with each communication region to transmit data packets to the receiving PLC device. Furthermore, to obtain a good estimate of the tone map, the receiving PLC device may estimate the tone map over multiple sounding messages, which can further increase the amount of time necessary to estimate the tone map for each of the communication regions. This may also increase the latency associated with the start of data packet transmission. Depending on the number of sounding messages that are needed per communication region to estimate the tone map for each communication region, there may be a relatively long latency (e.g., six powerline cycles) before the transmitting PLC device starts transmitting data packets to the receiving PLC device. The long latency may affect the performance and quality-of-service of the transmitting and receiving PLC devices.

In some embodiments, the transmitting PLC device and the receiving PLC device can be configured to execute a two-stage process to estimate the tone map for each communication region of the powerline cycle. In the first stage, the receiving PLC device may estimate a common tone map across all the communication regions of the powerline cycle. The common tone map may be used for transmitting data packets in all of the communication regions. The transmitting PLC device can start transmitting the data packets using the common tone map as soon as the transmitting PLC device receives the common tone map from the receiving PLC device. In the second stage, the receiving PLC device can monitor the data packets received in each communication region. The receiving PLC device can determine whether to modify the common tone map for one or more communication regions depending on performance measurements in each communication region. If the receiving PLC device determines to modify the common tone map for a first communication region, the transmitting and the receiving PLC devices can restart the sounding process in the first communication region. While the common tone map for the first communication region is being modified, the transmitting PLC device can continue transmitting data packets in the remaining communication regions using the common tone map that is still valid for the other communication regions. Estimating the common tone map across all the communication regions can preclude the need for initially evaluating each communication region independently. Estimating the common tone map across all the communication regions can also reduce the latency associated with the start of data packet transmission. Furthermore, refining the tone map associated with some communication regions while continuing to transmit data packets in the remaining communication regions can minimize disruption to data packet transmission.

FIG. 1 is an example block diagram of a communication network 100 including a mechanism for estimating a tone map. The communication network 100 includes network devices 102 and 104. The network device 102 includes a front-end transceiver unit 106, a packet generation unit 108, and a tone map estimation unit 110. Likewise, the network device 104 includes a front-end transceiver unit 112, a tone map estimation unit 114, and a packet generation unit 116. The network device 102 is communicatively coupled with the network device 104 via a communication link 118. The communication link 118 may be a powerline communication (PLC) link, a WLAN link, or another suitable communication link.

In some implementations, the network devices 102 and 104 can be electronic devices such as power meters, electric vehicle charging stations, electric vehicles, power generators, electric power distribution devices, laptop computers, tablet computers, mobile phones, smart appliances, gaming consoles, access points, or other suitable electronic devices with various communication capabilities (e.g., WLAN communication capabilities, PLC capabilities, Ethernet communication capabilities, etc.). In some implementations, the communication network 100 may be an indoor PLC network (e.g., a home or office network); while in other implementations, the communication network 100 may be an outdoor PLC network (e.g., a smart power grid). In some embodiments, the network devices 102 and 104 can be configured to communicate using HomePlug AV/AV2/GreenPHY communication protocols, IEEE 1905 communication protocols, and/or other suitable powerline communication protocols. In some embodiments, in addition to (or instead of) the PLC protocols, the network devices 102 and 104 may be configured to implement other suitable wired or wireless communication protocols, such as WLAN communication protocols (e.g., IEEE 802.11 communication protocols), Ethernet protocols, MoCA protocols, Bluetooth® protocols, WiMAX protocols, and so on.

A powerline network may be formed using a line (L) wire, a neutral (N) wire, and a ground (G) wire. For powerline communication, the network devices 102 and 104 may use the line, neutral, and ground wires to transmit and receive messages across the powerline network. A pair of wires over which a PLC signal is differentially transmitted (or received) over the powerline network is referred to as a transmit port (or a receive port). In some embodiments, the network devices 102 and 104 may implement single-input single-output (SISO) communication by exchanging PLC signals to/from a single port (e.g., an L-N port) over a single communication channel. In other embodiments, the network devices 102 and 104 may implement multiple-input multiple-output (MIMO) communication by exchanging PLC signals to/from two or more ports and over two or more communication channels. For example, a powerline MIMO communication system may include two transmit ports (e.g., an L-N port and an L-G port) and four receive ports (e.g., an L-N port, an L-G port, an N-G port, and common mode). A common mode signal may be a portion of the transmitted PLC signal that leaks to ground and may be received at a receiving PLC device by providing a low-capacitance path to ground (e.g., by using a large ground plane at the receiving PLC device). For convenience, subsequent operations of the transmitting PLC device and the receiving PLC device will be described for a MIMO PLC system with two transmit ports and two receive ports (i.e., 2×2 MIMO PLC system). However, it is noted that the operations described herein can be extended to MIMO PLC systems that include other suitable number of transmit ports and receive ports (e.g., a 2×3 MIMO PLC system, a 3×3 MIMO PLC system, etc.). In some embodiments, the network devices 102 and 104 may use orthogonal frequency division multiplexing (OFDM) to communicate via the powerline network. In accordance with the OFDM, the network device 102 may simultaneously transmit data over multiple orthogonal carrier signals (also referred to as "communication sub-carriers").

Noise in the powerline network is typically synchronous to the alternating current (AC) powerline cycle (e.g., a 50 Hz or 60 Hz AC powerline signal) because of dynamic loading effects. For example, PLC devices and other network devices connected to the powerline network may switch ON/OFF periodically, thus contributing to the noise and interference on the powerline network. In some embodiments, to combat the effects of periodic noise variations on the powerline network, each half of the AC powerline cycle may be divided into multiple consecutive time intervals, referred to as "communication regions." In one example, each half of the AC powerline cycle may be divided into five communication regions. In other examples, each half of the AC powerline cycle may be divided into any suitable number of communication regions. In some embodiments, each of the communication regions may have the same time interval. In other embodiments, some or all of the communication regions may have a different time interval. Because of the time-varying characteristics of the PLC environment and the noise on the powerline network, each communication region may have a different noise profile, different signal-to-noise ratio (SNR), and a different tone map. The tone map may refer to communication parameters used for communications between the network devices 102 and 104. The tone map may include the number of bits that can be transmitted on each communication sub-carrier (or bit loading information), beamforming parameters for each communication sub-carrier, coding rate, guard interval, transmit power spectral density, inter-frame spacing, etc.

The tone map of a communication region is typically influenced by the frequency characteristics of a PLC channel and the noise that is synchronous to the powerline cycle. To efficiently estimate the tone map for the network device 102, the network device 104 may initially operate under the assumption of a static (or approximately static) PLC channel. In other words, the network devices 102 and 104 may assume that the tone map is common across all the communication regions of the powerline cycle. The packet generation unit 108 of the network device 102 may generate and transmit sounding messages to the network device 104. The tone map estimation unit 114 may use the received sounding messages to initially estimate a common tone map across all the communication regions, instead of determining a different tone map for each communication region. The common tone map may include common beamforming parameters and common bit loading information. The front-end transceiver unit 112 may transmit the common tone map from the network device 104 to the front-end transceiver unit 106 of the network device 102. The packet generation unit 108 may apply the common tone map to each data stream and communication sub-carrier to generate data packets for transmission to the network device 104. For example, the packet generation unit 108 may distribute input data bits across multiple communication sub-carriers in accordance with the common bit loading information. The packet generation unit 108 may further combine the common beamforming parameters with the input data bits (or one or more data symbols) to generate the data packets. The front-end transceiver unit 106 may then transmit the data packets from the network device 102 to the network device 106.

The tone map estimation unit 114 may identify the data packets that were transmitted during each of the communication regions. The tone map estimation unit 114 may determine a performance measurement for each of the communication regions based on the corresponding identified data packets. The tone map estimation unit 114 may use the performance measurements to determine whether to modify (e.g., refine) the tone map for one or more of the communication regions. If the tone map estimation unit 114 determines to refine the tone map of a first communication region, the tone map estimation unit 114 may invalidate the tone map of the first communication region and prompt the network device 102 to retransmit the sounding messages in the first communication region. The network device 102 may transmit the sounding messages in the first communication region to allow the network device 104 to refine the tone map of the first communication region. The network device 102 may continue to transmit data packets in the remaining communication regions using the existing tone maps associated with each of the remaining communication regions. Operations of the network devices 102 and 104 for estimating a common tone map and refining the tone maps for one or more communication regions (if needed) are further described with reference to FIGS. 3-7.

FIG. 2A is a block diagram illustrating an example OFDM transmitting PLC device 200 configured to implement MIMO communication. FIG. 2B is a block diagram illustrating an example OFDM receiving PLC device 250 configured to implement MIMO communication. For example, the network device 102 of FIG. 1 may be configured as the transmitting PLC device 200; while the network device 104 may be configured as the receiving PLC device 250. The transmitting PLC device 200 includes a pre-processing unit 202, a bit splitting unit 204, mapping units 206A and 206B, a MIMO transmit processing unit 208, inverse fast Fourier transform (IFFT) units 210A and 210B, digital-to-analog conversion (DAC) units 212A and 212B, filter units 214A and 214B, and amplifier units ("amp") 216A and 216B. In the example of FIG. 2A, the transmitting PLC device 200 includes two transmit paths and generates two data streams from the input data bits for transmission via two transmit ports (e.g., an L-N transmit port and an L-G transmit port). However, embodiments are not so limited. In other embodiments, the transmitting PLC device 200 may include any suitable number of transmit paths, generate any suitable number of data streams, and consequently transmit the data streams from any suitable number of transmit ports (e.g., an L-N transmit port, an L-G transmit port, and an N-G transmit port).

In FIG. 2A, the pre-processing unit 202 may include a forward error correction (FEC) unit and an interleaving unit. The FEC unit may encode the input data bits to be transmitted. Next, the interleaving unit may interleave the encoded input data bits to minimize frequency-selective fading and interference. The bit-splitting unit 204 may divide the resultant input bit stream into two sub-streams $b_1$ and $b_2$. Each bit stream is provided to a corresponding independent mapping unit 206A and 206B. The mapping units 206A and 206B may modulate the input bits in their respective bit stream onto constellation symbols. Each of the mapping units 206A and 206B may convert an input bit stream into a symbol stream, such that the number of symbols is less than or equal to the number of bits. In some embodiments, the mapping unit 206A and the mapping unit 206B may use the same modulation scheme (and consequently, constellation set) to map the input bit stream to a symbol stream. In other embodiments, the mapping unit 206A and the mapping unit 206B may each use a different modulation scheme to map the input bit stream to a symbol stream. If $S_1(k)$ and $S_2(k)$ represent the first symbol stream and the second symbol stream transmitted on sub-carrier k of the OFDM system, the two symbol streams may be represented a symbol vector stream S(k), as shown in Eq. 1.

$$\underline{S}(k) = \begin{bmatrix} S_1(k) \\ S_2(k) \end{bmatrix} \qquad \text{Eq. 1}$$

The resultant symbol streams $S_1$ and $S_2$ may be provided to the MIMO transmit processing unit 208. The MIMO transmit processing unit 208 may implement functionality for spatial multiplexing, beamforming, space-time coding, etc. In some embodiments, the packet generation unit 108 and 116 may each include the pre-processing unit 202, the bit splitting unit 204, the mapping units 206A and 206B, the MIMO transmit processing unit 208, and additional functionality described below for applying an appropriate tone map for data transmission in each communication region. As will be further described in FIGS. 3-4 and 7, the packet generation unit 108 may apply the appropriate tone map to generate a data packet (or a sounding message) in an appropriate communication region and along each transmit path. In some embodiments, the MIMO transmit processing unit 208 may determine a transmit vector stream, $\underline{x}(k)$ by multiplying the symbol vector stream $\underline{S}(k)$ by beamforming matrix V(k), as depicted in Eq.

2. The transmit vector stream $\underline{x}(k)$ represents the data streams that will be transmitted by the transmitting PLC device 200 and are represented by Eq. 3.

$$\underline{x}(k) = V(k)\underline{S}(k) \qquad \text{Eq. 2}$$

$$\underline{x}(k) = \begin{bmatrix} x_1(k) \\ x_2(k) \end{bmatrix} \qquad \text{Eq. 3}$$

In some embodiments, beamforming matrix V for communication sub-carrier k maybe represented in terms of beamforming angles, ψ and θ, as depicted with reference to Eq. 4.

$$V(k) = \begin{bmatrix} 1 & 0 \\ 0 & e^{j\psi(k)} \end{bmatrix} \begin{bmatrix} \cos\theta(k) & \sin\theta(k) \\ -\sin\theta(k) & \cos\theta(k) \end{bmatrix} \qquad \text{Eq. 4}$$

In some embodiments, the front-end transceiver units 106 and 112 may each include the IFFT units 210A and 210B, the DAC units 212A and 212B, the filter units 214A and 214B, and the amplifier units 216A and 216B. The symbol streams at the output of the MIMO transmit processing unit 208 are provided to IFFT units 210A and 210B. The IFFT units 210A and 210B convert the respective frequency-domain symbol stream to a time-domain signal. The output of the IFFT units 210A and 210B is provided to corresponding DAC units 212A and 212B for digital to analog conversion, filter units 214A and 214B, and amplifier units 216A and 216B. In the example of FIG. 2A, the amplifier unit 216A is coupled to the L-N transmit port. The resultant data stream at the output of the amplifier unit 216A may be transmitted from the L-N transmit port onto the L-N PLC channel. The L-N PLC channel may be formed by a line and neutral wire pair of the powerline network. The amplifier unit 216B is coupled to the L-G transmit port. The resultant data stream at the output of the amplifier unit 216B may be transmitted from the L-G transmit port onto the L-G PLC channel. The L-G PLC channel may be formed by a line and ground wire pair of the powerline network. In other embodiments, any suitable transmit ports may be used to transmit the data streams on any suitable number of PLC channels of the powerline network. In some embodiments, the transmitting PLC device may dynamically select the transmit ports for transmitting the data streams. For example, the transmitting PLC device may select the transmit ports based, at least in part, on a performance measurement associated with each of the PLC channels. In another embodiment, the transmit ports that should be used for transmitting the data streams may be predetermined. In another embodiment, the transmitting PLC device 200 may negotiate with the receiving PLC device 250 to select the transmit ports. In another embodiment, the transmitting PLC device 200 may receive a notification from the receiving PLC device 250 identifying the transmit ports that should be used to transmit the data streams.

The receiving PLC device 250 of FIG. 2B includes amplifier units 252A and 252B, filter units 254A and 254B, analog-to-digital conversion (ADC) units 256A and 256B, FFT units 258A and 258B, a MIMO receive processing unit 260, de-mapping units 262A and 262B, a bit combining unit 264, and a processing unit 266. In the example of FIG. 2B, the receiving PLC device 250 includes two receive paths and receives two data streams from two receive ports (e.g., an L-N receive port and an L-G receive port). However, embodiments are not so limited. In other embodiments, the receiving PLC device 250 may include any suitable number of receive paths and may receive data streams from any suitable number of receive ports (e.g., an L-N receive port, an L-G receive port, and an N-G receive port).

In the example of FIG. 2B, the receiving PLC device 250 receives two data streams—a first data stream at an L-N receive port and a second data stream at an L-G receive port. In other embodiments, other suitable receive ports may be used to receive the data streams from the powerline network. The data stream received from the L-N PLC channel may be provided to the amplifier unit 252A; while the data stream received from the L-G PLC channel may be provided to the amplifier unit 252B. The output of the amplifier units 252A and 252B may be provided to the corresponding filter units 254A and 254B, ADC units 256A and 256B, and FFT units 258A and 258B. The FFT units 258A and 258B may convert the respective time domain signal into a frequency-domain symbol stream. The output of each FFT unit 258A and 258B is provided to the MIMO receive processing unit 260. The MIMO receive processing unit 260 may implement functionality for spatial de-multiplexing and space-time decoding.

In the example of FIG. 2B, the resultant symbol streams $\hat{s}_1$ and $\hat{s}_2$ at the output of the MIMO receive processing unit 260 may be provided to de-mapping units 262A and 262B. The de-mapping units 262A and 262B may convert the symbol streams $\hat{s}_1$ and $\hat{s}_2$ to corresponding bit streams $\hat{b}_1$ and $\hat{b}_2$. Based on knowledge of the modulation scheme employed at the transmitting PLC device 200, the de-mapping units 262A and 262B can execute demodulation operations to generate the bit streams $\hat{b}_1$ and $\hat{b}_2$. The bit streams $\hat{b}_1$ and $\hat{b}_2$ are then provided to the bit combining unit 264. The bit combining unit 264 may combine the bit streams $\hat{b}_1$ and $\hat{b}_2$ to yield a combined bit stream. The processing unit 266 may include an FEC decoding unit and a de-interleaving unit. The de-interleaving unit may de-interleave the combined bit stream while the FEC decoding unit may decode the combined bit stream to recover the input data bits originally transmitted by the PLC device 200.

In some embodiments, the front-end transceiver units 106 and 112 may each include the amplifier units 252A and 252B, the filter units 254A and 254B, the ADC units 256A and 256B, the FFT units 258A and 258B. The tone map estimation units 110 and 114 may each include the MIMO receive processing unit 260, the de-mapping units 262A and 262B, the bit combining unit 264, the processing unit 266, and additional functionality described in FIGS. 1 and 3-6 for estimating the tone map for the transmitting PLC device. The tone map estimation unit 114 may estimate the MIMO PLC channel between the transmitting PLC device 200 and the receiving PLC device 250 based on sounding messages received from the transmitting PLC device 200. The tone map estimation unit 114 may compute the beamforming matrix V(k) from the estimated MIMO PLC channel. More generally, the tone map estimation unit 114 may estimate and modify tone maps for each communication region in the powerline cycle based on sounding messages received from the transmitting PLC device 200. The tone map estimation unit 114 may determine whether to refine the current or initial tone map estimate for one or more communication regions based on the performance measurement associated with each of the communication regions.

Although not described above, in some embodiments, functionality of the packet generation unit 108 (or 116) for generating the data packet may be included in the MIMO transmit processing unit 208. In some embodiments, all the components 202-216B of the transmitter PLC device 200 may be included in the front-end transceiver units 106 and 112. In some embodiments, functionality of the tone map estimation unit 114 for estimating the tone map associated with one or more communication regions may be included in the MIMO receive processing unit 260. In this embodiment, the operations for tone map estimation may be executed prior to decoding the input data bits. In other embodiments, the functionality of the tone map estimation unit 114 for estimating the tone map associated with one or more communication regions may be included in the processing unit 266. In this embodiment, the operations for tone map estimation may be executed after decoding the input data bits. Furthermore, in some embodiments, some or all of the components depicted in FIGS. 2A and 2B may be included in the front-end transceiver units 106 and 112.

Figure 3:
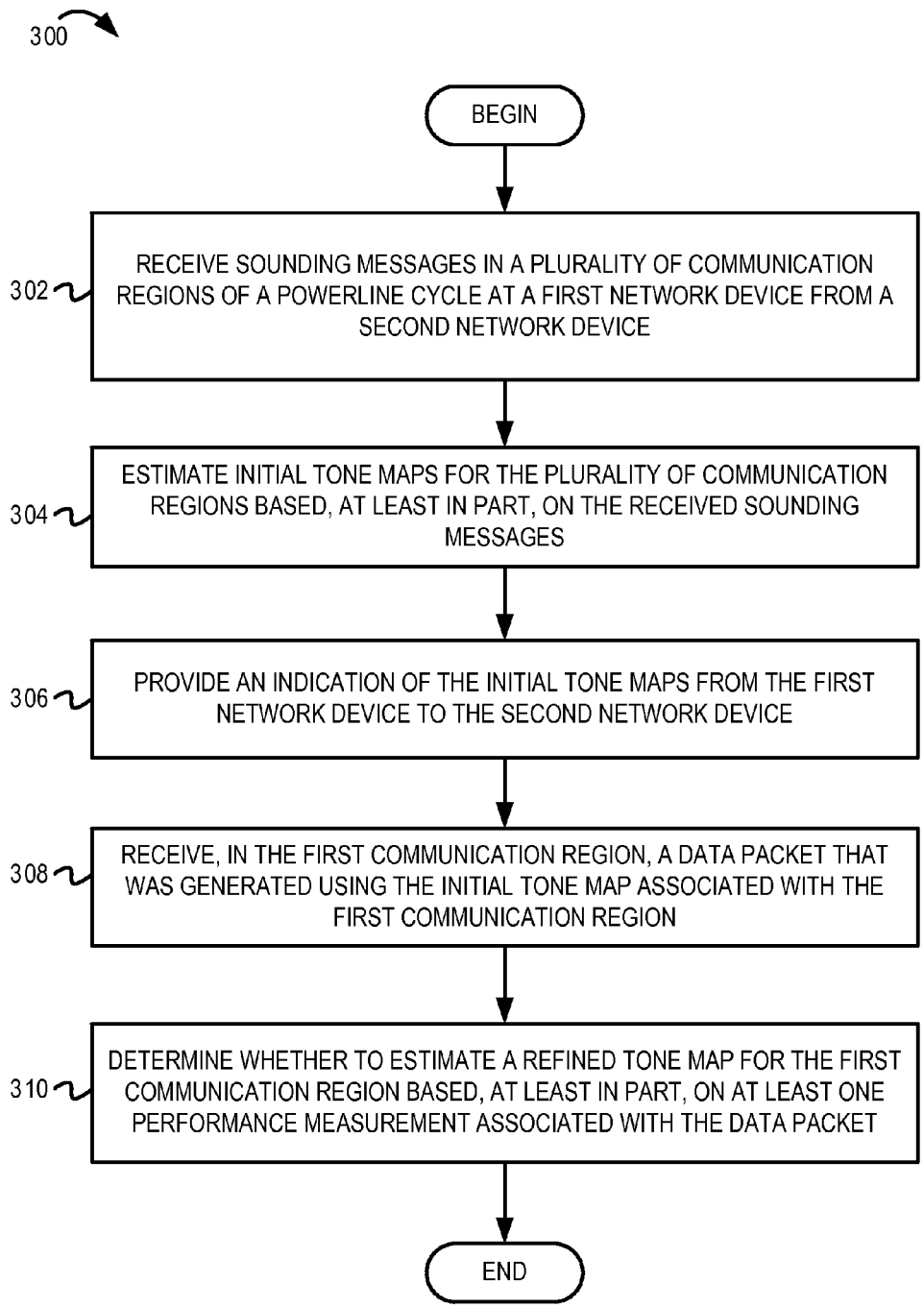
FIG. 3 is a flow diagram illustrating example operations for estimating a tone map in a PLC network.

FIG. 3 is a flow diagram ("flow") 300 illustrating example operations for estimating a tone map in a powerline communication network. The flow 300 begins at block 302.

At block 302, a first network device receives sounding messages in a plurality of communication regions of a powerline cycle from a second network device. In some embodiments, the each half of a 50 Hz/60 Hz powerline cycle may be divided into multiple communication regions. In some embodiments, each of the communication regions may have the same time interval. In other words, the duration for which the first and the second network devices communicate during each communication region may be equal. In other embodiments, some or all of the communication regions may have a different time interval. With reference to the example of FIG. 1, the front-end transceiver unit 112 of the first network device may receive the sounding messages from the front-end transceiver unit 106 of the second network device. In some embodiments, the number of sounding messages transmitted by the second network device may be preconfigured. In another embodiment, the first network device and the second network device may negotiate and agree upon the number of sounding messages that should be exchanged for tone map estimation. The flow continues at block 304.

At block 304, the first network device estimates initial tone maps for the plurality of communication regions based, at least in part, on the received sounding messages. In some embodiments, the initial tone maps for the plurality of communication regions may be a common tone map that is valid across all the communication regions. Referring to the example of FIG. 1, the tone map estimation unit 114 of the network device 104 may estimate the common tone map to enable the network device 102 to transmit subsequent data packets in the plurality of communication regions. In some embodiments, the tone map estimation unit 114 may determine the channel information across the entire powerline cycle (e.g., across all the communication regions) and may average SNR information across the powerline cycle. The tone map estimation unit 114 may estimate the common tone map for the second network device using the information determined and averaged across the entire powerline cycle, instead of on a region-by-region basis. The tone map may include beamforming parameters for each communication sub-carrier of the PLC channel and bit loading information for each communication sub-carrier of the PLC channel. The beamforming parameters may depend on characteristics of the communication channels between the first network device and the second network device. The beamforming parameters may be used to weight data (e.g., one or more data symbols) transmitted in a multi-steam or multi-transmitter environment to compensate for channel variations or noise. In some embodiments, the beamforming parameters may include a beamforming matrix (also referred to as "pre-coding matrix") for each of the communication sub-carriers. In other embodiments, the beamforming parameters may include beamforming angles $\psi$ and $\theta$ for each of the communication sub-carriers. The bit loading information can indicate how many bits can be mapped to the communication sub-carrier without a negative performance impact. Using the information averaged across the entire powerline cycle can allow the tone map estimation unit 114 to obtain a good estimate of the PLC channel and the common tone map.

Figure 4:
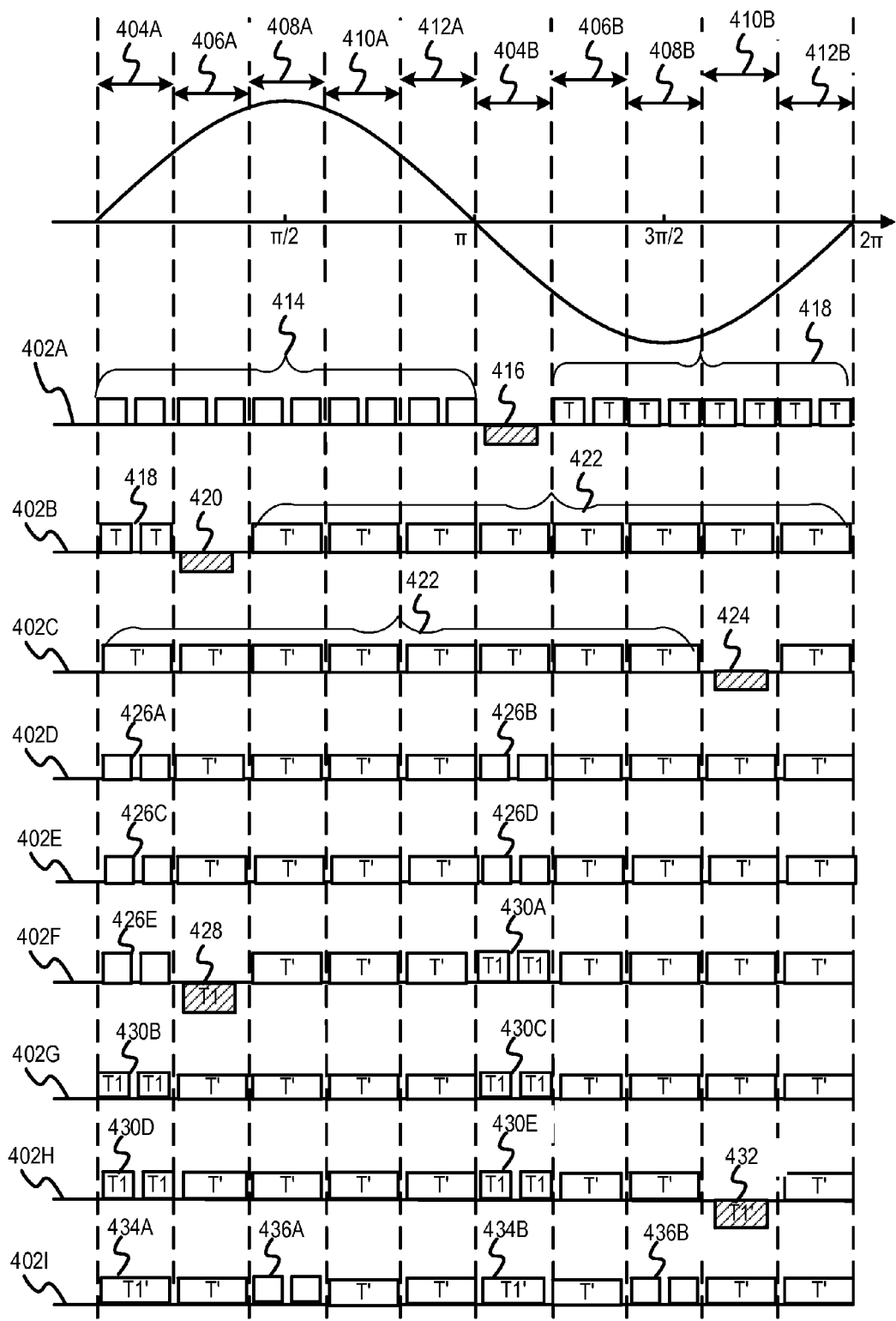
FIG. 4 is a timing diagram illustrating example operations for estimating a tone map in a PLC network.
Figure 5:
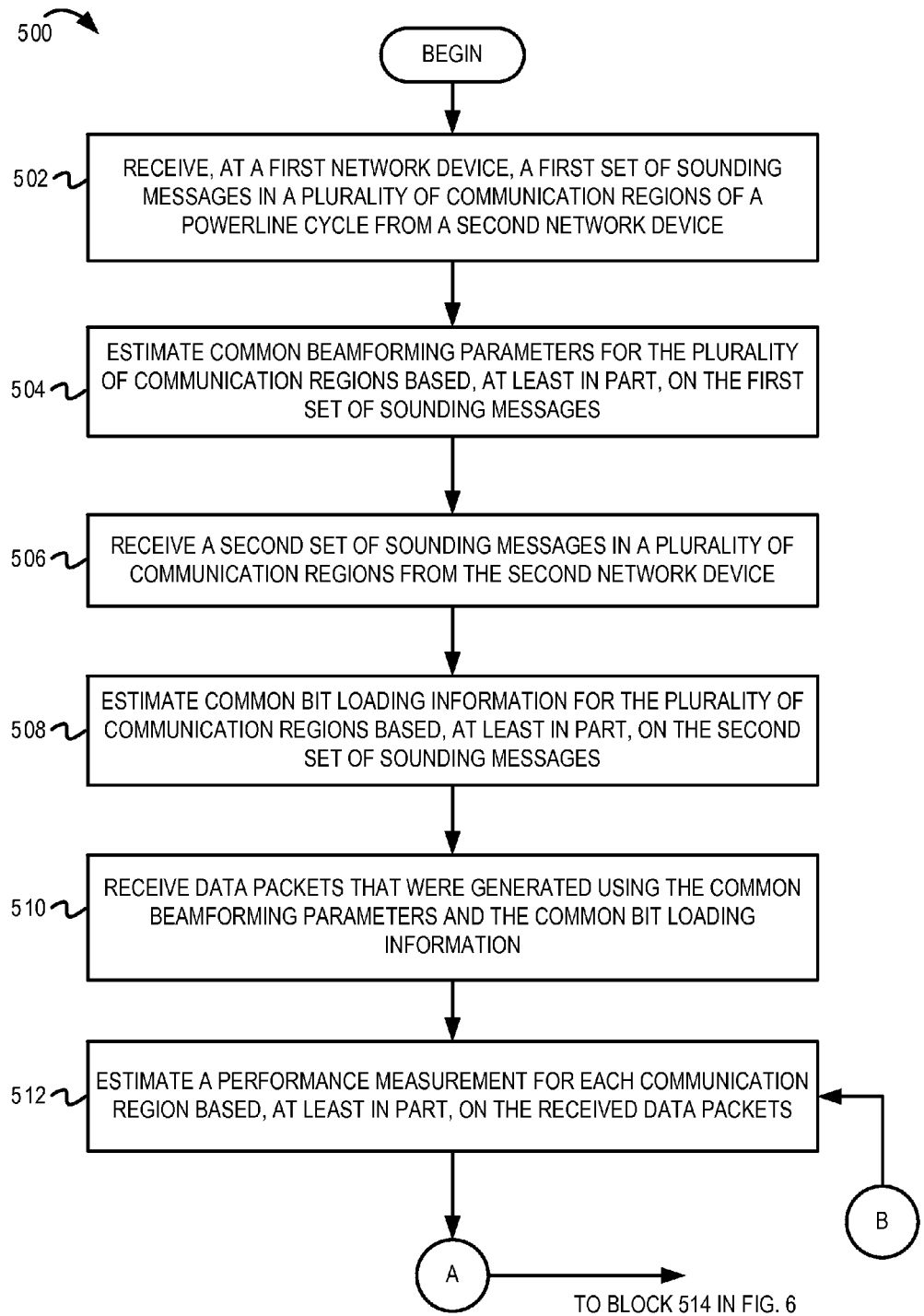
FIG. 5 is a flow diagram illustrating example operations of a receiving PLC device for estimating a tone map in a PLC network.
Figure 6:
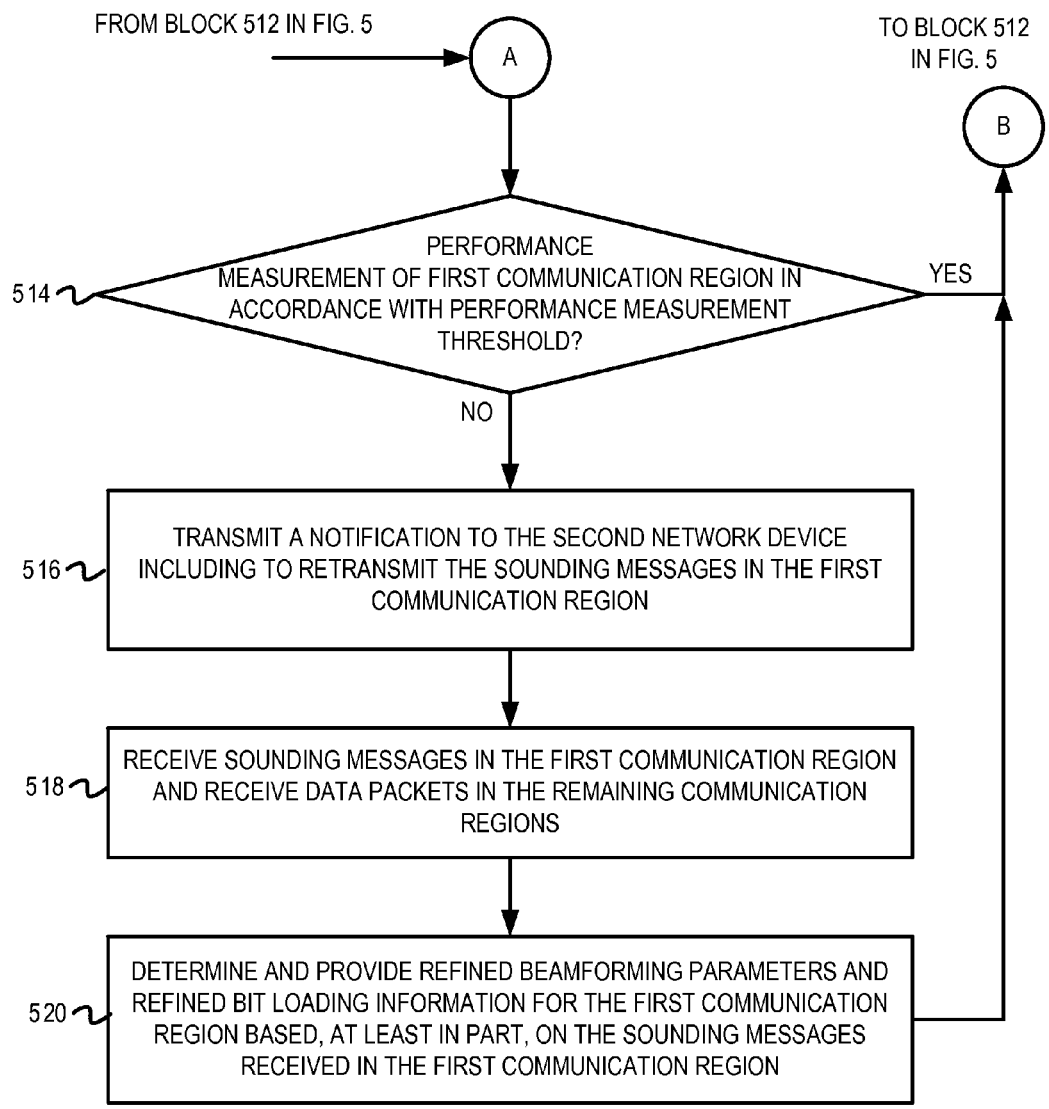
FIG. 6 is a continuation of FIG. 5 and also illustrates example operations of the receiving PLC device for estimating the tone map in a PLC network.

The tone map estimation unit 114 may estimate the common tone map for the second network device, as described in FIGS. 4-6. Specifically, the tone map estimation unit 114 may receive a first set of sounding messages from the second network device. The tone map estimation unit 114 may use the first set of sounding messages to estimate common beamforming parameters for the second network device over the entire powerline cycle. The tone map estimation unit 114 may provide the common beamforming parameters to the second network device. The tone map estimation unit 114 may then receive a second set of sounding messages from the second network device. The second network device may apply the common beamforming parameters to the second set of sounding messages. The tone map estimation unit 114 may use the second set of sounding messages to estimate and provide the common bit loading information for the second network device over the entire powerline cycle.

In some embodiments, the initial tone maps associated with the communication regions may not be the common tone map. Instead, after one or more iterations of refining tone maps (described in FIGS. 1 and 4-7), some or all of the communication regions may be associated with different tone maps. In this embodiment, the initial tone map associated with each communication region may refer to an existing or current tone map that is being used to transmit data packets in a corresponding communication region. The flow continues at block 306.

At block 306, the first network device provides an indication of the common tone map to the second network device. For example, the tone map estimation unit 114 may provide the common beamforming parameters and the common bit loading information to the front-end transceiver unit 112. The front-end transceiver unit 112, in turn, may transmit the beamforming parameters and the common bit loading information to the second network device. The packet generation unit 108 of the second network device 102 may use the common tone map to transmit data packets in the plurality of communication regions. The flow continues at block 308.

At block 308, the first network device receives, in the first communication region, a data packet that was generated using the initial tone map associated with the first communication region. In some embodiments, the front-end transceiver unit 112 may receive data packets in accordance with the common tone map. The packet generation unit 108 of the second network device may distribute input data bits across the plurality of communication sub-carriers in accordance with the common bit loading information. The second network device may further combine the common beamforming parameters with the data bits (or one or more data symbols) to minimize noise and interference effects on the PLC channel between the first network device and the second network device. The tone map estimation unit 114 can use data packets received in each communication region in accordance with the common tone map to determine whether to estimate a new and refined tone map for the corresponding communication region.

In another embodiment, for each communication region, the tone map estimation unit 114 may receive data packets that are generated in accordance with the initial tone map associated with the communication region. For each communication region, the tone map estimation unit 114 can use the data packets received in the communication region to determine whether to modify (e.g., refine) the initial tone map associated with the communication region. The flow continues at block 310.

At block 310, the first network device determines whether to estimate a refined tone map for the first communication region based, at least in part, on at least one performance measurement associated with the data packet. The performance measurements may include a signal-to-noise ratio, an attenuation level, an error rate, other suitable performance measurements, and/or combinations of performance measurements. In some embodiments, after the second network device starts transmitting data packets using the common tone map, the tone map estimation unit 114 of the network device 104 may determine the performance measurement of each communication region. For example, the tone map estimation unit 114 may receive a predetermined number of data messages per communication region. For each communication region, the tone map estimation unit 114 may determine a performance measurement of the communication region using the predetermined number of data messages. The tone map estimation unit 114 may compare the performance measurement of the communication region against a performance measurement threshold to determine whether to estimate a refined tone map for the communication region. For example, the second network device may continue to use the common tone map for data transmission in the first communication region, if the performance measurement of the first communication region is in accordance with the performance measurement threshold. As another example, if the performance measurement of the first communication region is not in accordance with the performance measurement threshold, the second network device may not use the common tone map for data transmission in the first communication region, and instead may determine to refine the tone map for the first communication region. In this example, the first network device may prompt the second network device to retransmit the sounding messages in the first communication region. The first network device may also prompt the second network device to continue transmitting the data messages (using the common tone map) in the remaining communication regions.

In another embodiment, for each communication region, the tone map estimation unit 114 may determine the performance measurement of the communication region based on data packets that were generated using the initial tone map associated with the communication region. As similarly described above, the tone map estimation unit 114 may compare the performance measurements against a performance measurement threshold to determine whether to modify (e.g., refine) the initial tone map associated with one or more communication regions. If the tone map estimation unit 114 determines to refine the initial tone map associated with the first communication region, the tone map estimation unit 114 can prompt the second network device to transmit the sounding messages in the first communication region and transmit data packets in the remaining communication regions using the corresponding initial tone map. From block 310, the flow ends.

FIG. 4 is a timing diagram illustrating example operations for estimating a tone map in a PLC network. FIG. 4 depicts consecutive powerline cycles 404A-404I. In the example of FIG. 4, each half of a powerline cycle is divided into five communication regions. However, in other embodiments, the powerline cycle may be divided into any suitable number of communication regions. In one embodiment, the number and duration of communication regions in the positive half of the powerline cycle may be the same as the number and duration of communication regions in the negative half of the powerline cycle. In the example of FIG. 4, the characteristics of the communication regions in the positive half of the powerline cycle may be approximately the same as the characteristics of the corresponding communication regions in the negative half of the powerline cycle. For convenience, the communication regions are depicted with suffixes A and B to distinguish between the communication regions in the positive half and the negative half of the powerline cycle. In FIG. 4, the positive half of the powerline cycle is divided into five communication regions 404A, 406A, 408A, 410A, and 412A. The negative half of the powerline cycle is divided into five communication regions 404B, 406B, 408B, 410B, and 412B. In one example of this embodiment, the tone map generated for the communication region 404A may also be used in the communication region 404B. In the description of FIG. 4, the communication regions 404A and 404B may be considered as the same communication region and may be collectively referred to as communication region 404. Likewise, the communication regions 406A and 406B may be collectively referred to as communication region 406; the communication regions 408A and 408B may be collectively referred to as communication region 408; the communication regions 410A and 410B may be collectively referred to as communication region 410; and the communication regions 412A and 412B may be collectively referred to as communication region 412. However, in other embodiments, the number, duration, and/or characteristics of communication regions in the positive half of the powerline cycle may be different from the number, duration, and/or characteristics of communication regions in the negative half of the powerline cycle. In one example of this embodiment, the tone map generated for the communication region 404A may be different from the tone map generated for the communication region 404B.

A first PLC device estimates a common tone map for a second PLC device during the powerline cycles 402A and 402B. The second PLC device transmits a predetermined number of sounding messages 414 to the first PLC device. The second PLC device may not apply any beamforming parameters to generate the sounding messages 414. The sounding messages 414 that are generated without beamforming parameters are referred to as "non-beamformed sounding messages." In the example of FIG. 4, the second PLC device transmits two non-beamformed sounding messages in each communication region, thus transmitting ten non-beamformed sounding messages to the first PLC device. In a MIMO OFDM PLC network, the second PLC device may transmit the non-beamformed sounding messages on a plurality of communication sub-carriers and from multiple transmit ports, as described with reference to FIG. 1. For example, if the sounding messages are transmitted from an L-N transmit port and an L-G transmit port, then each sounding message represents a transmission on each communication sub-carrier of an L-N communication channel and a transmission on each communication sub-carrier of an L-G communication channel.

The first PLC device receives the non-beamformed sounding messages 414 and estimates common beamforming parameters for a composite MIMO PLC channel. Referring to the above example, where the sounding messages are transmitted on the L-N communication channel and the L-G communication channel, the first PLC device may estimate a 2×2 channel matrix for each communication sub-carrier of the composite L-N and L-G communication channels. The first PLC device may determine a 2×2 beamforming matrix for each communication sub-carrier from the channel matrix. In some embodiments, the beamforming parameters may include a collection of the beamforming matrices for each communication sub-carrier. In other embodiments, the beamforming parameters may include a collection of the beamforming angles ψ and θ for each communication sub-carrier. The common beamforming parameters may be valid across all the communication regions 404-412 of the powerline cycle.

The first PLC device transmits the common beamforming parameters to the second PLC device in a management message 416. The second PLC device may apply the common beamforming parameters to a next set of sounding messages and may transmit the resultant beamformed sounding messages 418 to the first PLC device. The second PLC device may transmit the beamformed sounding messages on the plurality of communication sub-carriers and from multiple transmit ports, as described with reference to FIG. 1. The first PLC device receives the beamformed sounding messages 418 and estimates common bit loading information for each communication channel between the first PLC device and the second PLC device. For each communication channel, the common bit loading information can indicate how many bits should be transmitted on each communication sub-carrier of the communication channel. The first PLC device transmits the common bit loading information to the second PLC device in a management message 420. The common beamforming parameters and the common bit loading information are collectively referred to as a common tone map. The second PLC device may apply the common tone map to subsequently transmitted data packets 422 (depicted using T' in FIG. 4 to indicate the use of the common tone map) during powerline cycles 402B and 402C. By estimating a common tone map for all the communication regions, the latency associated with starting the data packet transmission can be minimized. In the example shown in FIG. 4, the latency associated with starting the data packet transmission is 1.2 powerline cycles.

The first PLC device receives the data packets 422 that were generated using the common tone map and uses the data packets 422 to determine whether to modify (e.g., refine) the tone map for any of the communication regions. For each of the communication regions 404-412, the first PLC device may identify the subset of the data packets 422 that were received during the corresponding communication region. For each of the communication regions 404-412, the first PLC device may use the appropriate subset of the data packets 422 to determine the performance measurement associated with the communication region. The first PLC device may compare the performance measurement of each communication region against a performance measurement threshold. In some embodiments, the performance measurements associated with each of the communication regions 404-412 may be compared against a common performance measurement threshold. In other embodiments, performance measurements associated with each of the each of the communication regions 404-412 may be compared against a corresponding different performance measurement threshold. The first PLC device may identify a communication region with a performance measurement that is not in accordance with the performance measurement threshold. For example, the first PLC device may determine that the SNR of the communication region 404 is lower than an SNR threshold. As another example, the first PLC device may determine that the error rate (e.g., bit error rate, frame error rate, etc.) of the communication region 404 exceeds an error rate threshold. As another example, the first PLC device may determine that the attenuation level of the communication region 404 exceeds an attenuation threshold. As another example, the first PLC device may determine that a combination performance measurement is not in accordance with an appropriate threshold. In some embodiments, the performance measurement threshold may be predetermined based on simulations and/or historical performance of the first and the second PLC devices in the PLC network. In other embodiments, the performance measurement threshold may be dynamically configurable based on a current performance of the first and the second PLC devices in the PLC network.

The first PLC device may invalidate the tone map associated with the communication region 404. The first PLC device may transmit a management message 424 to notify the second PLC device to restart the sounding process for the communication region 404 by retransmitting sounding messages in the communication region 404. The management message 424 may indicate that the common tone map has been invalidated in the communication region 404 and that the common tone map is still valid in the remaining communication regions 406-412. Restarting the sounding process for the communication region 404 can allow the second PLC device to estimate a refined tone map for the communication region 404. Transmitting the data packets in the remaining communication regions 406-412 can minimize disruption to application data transmission (e.g., video stream packets, file transfer packets, etc.) from the first PLC device to the second PLC device.

In response to receiving the message 424, the second PLC device transmits non-beamformed sounding messages 426A-426E in the communication regions 404A and 404B of the powerline cycles 402D-402F. The second PLC device continues to transmit the data packets in the communication regions 406-412 of the powerline cycles 402D-402F using the common tone map. After the first PLC device receives a predetermined number of non-beamformed sounding messages 426A-426E, the first PLC device may estimate the refined beamforming parameters (also referred to as modified beamforming parameters) for the first communication region 404. The first PLC device transmits message 428 including the refined beamforming parameters to the second PLC device. The second PLC device generates beamformed sounding messages 430A-430E using the refined beamforming parameters. The second PLC device transmits the beamformed sounding messages 430A-430E in communication regions 404A and 404B of the powerline cycles 402F-402H. The second PLC device continues to transmit the data packets in the communication regions 406-412 of the powerline cycles 402F-402H using the common tone map. After the first PLC device receives a predetermined number of beamformed sounding messages 430A-430E, the first PLC device may estimate the refined bit loading information (also referred to as modified bit loading information) for the first communication region 404. The first PLC device transmits message 432 including the refined bit loading information to the second PLC device. The refined beamforming parameters and the refine bit loading information may collectively be referred to as a refined tone map (also referred to as a modified tone map). In some embodiments, in addition to the refined bit loading information, the message 432 may also include a notification that the first PLC device should restart the sounding process for the communication region 408.

In response to receiving the message 432, the second PLC device transmits the non-beamformed sounding messages in the communications region 408, transmits data packets in the communication region 404 using the refined tone map received for the communication region 404, and transmits data packets in the communication regions 406, 410, and 412 using the common tone map. As depicted in the example of FIG. 4, the second PLC device transmits data packets 434A and 434B in the communication regions 404A and 404B, respectively, of the powerline cycle 402I. The data packets 434A and 434B are generated using the refined tone map for the communication region 404 (depicted by T1'). The second PLC device continues to transmit data packets using the common tone map (depicted by T') in the communication regions 406A, 410A, 412A, 406B, 410B, and 412B of the powerline cycle 402I. The second PLC device transmits non-beamformed sounding messages 436A and 436B in the communication regions 408A and 408B, respectively, of the powerline cycle 402I. Although not depicted in FIG. 4, after the first PLC device receives a predetermined number of non-beamformed sounding messages in the communication region 408, the first PLC device can determine the refined beamforming parameters for the communication region 408. As similarly described above, the first PLC device can determine the refined tone map for the communication region 408. The second PLC device may then transmit data packets in the communication region 404 using a first refined tone map associated with the communication region 404, transmit data packets in the communication region 408 using a second refined tone map associated with the communication region 408, and transmit data packets in the communication regions 406, 410, and 412 using the common tone map.

The first PLC device may continue to monitor the performance measurements of the communication regions 404-412 and determine whether the current tone maps assigned to any of the communication regions should be refined. For example, the first PLC device may determine that the communication region 404 (associated with the first refined tone map) has a performance measurement that is not in accordance with the performance measurement threshold. Accordingly, the first PLC device may invalidate the first refined tone map, notify the second PLC device to retransmit the sounding messages in the communication region 404, and estimate a new and refined tone map for the communication region 404.

FIG. 5 and FIG. 6 depict a flow diagram 500 illustrating example operations of a receiving PLC device for estimating a tone map in a PLC network. The flow 500 begins at block 502 in FIG. 5.

At block 502, a first network device receives a first set of sounding messages in a plurality of communication regions of a powerline cycle from a second network device. In some embodiments, the first network device and the second network device may each be PLC-capable devices that implement PLC protocols (e.g., HomePlug AV/AV2/GreenPHY, IEEE 1905). In other embodiments, the first network device and the second network device may be configured to implement other suitable wired communication protocols (e.g., Ethernet, MoCA, etc.) and/or wireless communication protocols (e.g., WLAN). As described above with reference to FIGS. 3 and 4, the each half of a 50 Hz/60 Hz powerline cycle may be divided into multiple communication regions. With reference to the example of FIGS. 1 and 4, the front-end transceiver unit 112 may receive the first set of sounding messages 414 from the second network device. The second network device may not apply any beamforming parameters to the first set of sounding messages. The first set of sounding messages may include sounding messages transmitted on a plurality of communication sub-carriers from each transmit port of the second network device. The flow continues at block 504.

At block 504, common beamforming parameters are estimated for the plurality of communication regions based, at least in part, on the first set of sounding messages. The beamforming parameters may depend on characteristics of the communication channels between the first network device and the second network device. The beamforming parameters may be used to weight data (e.g., one or more data symbols) transmitted in a multi-steam or multi-transmitter environment to compensate for channel variations or noise, also referred to as "pre-coding." The tone map estimation unit 114 may estimate a composite MIMO PLC channel between the first network device and the second network device using the first set of sounding messages. The composite MIMO PLC channel can represent communication paths between multiple transmit ports of the second network device and multiple receive ports of the first network device. In some embodiments, the tone map estimation unit 114 can execute singular value decomposition operations (or eigen-value decomposition operations) to determine the common beamforming parameters from the channel estimate. In other embodiments, the tone map estimation unit 114 may use other suitable techniques to determine the common beamforming parameters. The common beamforming parameters may be determined across the entire powerline cycle and may be valid for all the communication regions of the powerline cycle. The front-end transceiver unit 112 may transmit the common beamforming parameters to the second network device. In some embodiments, the front-end transceiver unit 112 may transmit beamforming matrices for each communication sub-carrier that may be used across all the communication regions. In other embodiments, the front-end transceiver unit 112 may transmit beamforming angles for each communication sub-carrier that may be used across all the communication regions. The flow continues at block 506.

At block 506, the first network device receives a second set of sounding messages in a plurality of communication regions from the second network device. With reference to the example of FIGS. 1 and 4, the front-end transceiver unit 112 may receive the second set of sounding messages 418 from the second network device. The second network device may apply the common beamforming parameters to generate the second set of sounding messages. The second set of sounding messages may include sounding messages transmitted on the plurality of communication sub-carriers from each transmit port of the second network device. The flow continues at block 508.

At block 508, common bit loading information is estimated for the plurality of communication regions based, at least in part, on the received second set of sounding messages. The ability to transmit a different number of bits (e.g., to have different modulation sizes) on different communication sub-carriers is referred to as bit-loading. The bit loading information can indicate how many bits can be mapped to the communication sub-carrier without a negative performance impact. In some embodiments, the number of bits that can be mapped to each communication sub-carrier may be indicated in a vector referred to as a bit-loading table (BLT). For example, if the first network device and the second network device are configured to operate on N communication sub-carriers, and if $K_i$ represents the bit load for each communication sub-carrier, the then the vector $[K_1, K_2, \ldots, K_N]$ represents the bit-loading table. Each data stream transmitted from a transmit port may be associated with a bit loading table. With reference to the example of FIG. 2, the transmitting PLC device 200 transmits two data streams—one from the L-N transmit port and another from the L-G transmit port. Each data stream may be associated with a corresponding bit loading table. The bit loading table for each data stream may be collectively referred to as bit loading information.

The tone map estimation unit 114 may determine the performance measurement (e.g., SNR) associated with the second set of sounding messages. For each communication channel between the first and the second network devices, the tone map estimation unit 114 may determine how many bits should be mapped to each communication sub-carrier of the communication channel based on the performance measurement. The performance measurement and consequently the common bit loading information may be determined and averaged across the entire powerline cycle (e.g., across all the communication regions). The front-end transceiver unit 112 may transmit the common bit loading information to the second network device. The flow continues at block 510.

At block 510, the first network device receives data packets in the plurality of communication regions from the second network device, where the data packets are generated using the common beamforming parameters and the common bit loading information. As described above with reference to FIGS. 3 and 4, the second network device may distribute input data bits across the plurality of communication sub-carriers in accordance with the common bit loading information. The second network device may further combine the common beamforming parameters with the input data bits (or one or more data symbols) to generate the data packets 422. The tone map estimation unit 114 may receive the data packets 422 generated using the common tone map. The tone map estimation unit 114 can use the received data packets to analyze the performance of each communication region and determine whether to estimate a new and refined tone map for the corresponding communication region. The flow continues at block 512.

At block 512, a performance measurement is estimated for each communication region based, at least in part, on the received data packets. For each communication region, the tone map estimation unit 114 may determine the performance measurement for the communication region based on a subset of data packets received in the communication region using the common tone map. The performance measurements may include a signal-to-noise ratio, an attenuation level, an error rate, other suitable performance measurements, and/or combinations of performance measurements. As will be further described below, the tone map estimation unit 114 may determine whether to estimate a refined tone map (e.g., refined beamforming parameters and refined bit loading information) for a communication region based on the performance measurement associated with the communication region. The flow continues at block 514 in FIG. 6.

At block 514, it is determined whether the performance measurement of a first communication region is in accordance with performance measurement threshold. In some embodiments, the tone map estimation unit 114 may identify one or more communication regions with performance measurements that are not in accordance with the performance measurement threshold. With reference to the example of FIG. 4, the communication region 404 may not be in accordance with the performance measurement threshold if the SNR of the communication region 404 is lower than a threshold SNR. As another example, the communication region 404 may not be in accordance with the performance measurement threshold if the error rate in the communication region 404 exceeds a threshold error rate. If the performance measurement of at least one communication region is not in accordance with the performance measurement threshold, the flow continues at block 516. Otherwise, if the performance measurement of each communication region is in accordance with the performance measurement threshold, the flow loops back to block 512 where the first network device continues to monitor the performance measurement associated with each communication region.

At block 516, the first network device transmits a notification to the second network device to retransmit the sounding messages in the first communication region. For example, the performance measurement unit 116 may determine that the performance measurement of the first communication region 404 is not in accordance with the performance measurement threshold. The tone map estimation unit 114 may transmit a notification to the second network device to restart operations for estimating the tone map for the first communication region. In other words, the tone map estimation unit 114 may invalidate the tone map associated with the first communication region 404 and may prompt the second network device to re-transmit sounding messages in the first communication region 404. However, in other embodiments, the second network device may automatically re-transmit the sounding messages in the first communication region, in response to receiving the indication that the performance measurement of the first communication region is not in accordance with the performance measurement threshold. As will be further described below, the tone map estimation unit 114 may use the sounding messages to estimate refined beamforming parameters and refined bit loading information for the first communication region.

In some embodiments, the tone map estimation unit 114 may identify multiple communication regions with performance measurements that are not in accordance with the performance measurement thresholds. For example, the tone map estimation unit 114 may determine that the performance measurement of the communication regions 404 and 408 are not in accordance with the performance measurement thresholds. The tone map estimation unit 114 may determine whether to modify the tone maps for the identified communication regions 404 and 408 consecutively or in parallel. In one embodiment, the tone map estimation unit 114 may determine to modify the tone maps for the communication regions 404 and 408 consecutively; that is, first determine the modified tone map for the communication region 404, and then determine the modified tone map for the communication region 408 (one after the other). FIG. 4 illustrates example operations for modifying the tone maps for the communication regions 404 and 408 consecutively. As described above, the first network device may transmit a first notification to the second network device to retransmit the sounding messages in the communication region 404. While the first network device is estimating the modified tone map for the communication region 404, the second network device may continue to transmit data packets in the remaining communication regions 406, 408, 410, and 412 using the existing tone map(s). After determining the modified tone map for the communication region 404, the first network device may transmit a second notification to the second network device to retransmit the sounding messages in the communication region 408. While the first network device is estimating the modified tone map for the communication region 408, the second network device may transmit data packets in the communication region 404 using the modified tone map, and in the communication regions 406, 410, and 412 using the existing tone map(s). More generally, if the first device determines to modify the tone maps for multiple communication regions consecutively, the first network device may prompt the second network device to transmit the sounding messages in one of the communication regions, which may be referred to as the first communication region. After determining the modified tone map for the first communication region, the first network device may prompt the second network device to transmit the sounding messages in the next or second communication region. This process can continue until the first network device modifies the tone map for all of the communication regions with performance measurements that are not in accordance with the performance measurement threshold.

In another embodiment, the tone map estimation unit 114 may determine to modify the tone maps for the communication regions 404 and 408 in parallel (e.g., concurrently). Accordingly, the first network device may invalidate the existing tone maps associated with the communication regions 404 and 408 at the same time. The first network device can notify the second network device to transmit the sounding messages in both the communication regions 404 and 408. While the first network device is estimating the modified tone map for the communication regions 404 and 408, the second network device can continue to transmit the data packets in the remaining communication regions 406, 410, and 412. In some embodiments, the tone map estimation unit 114 may invalidate the tone maps for a predetermined number of communication regions in parallel.

In some embodiments, whether to estimate the refined tone maps consecutively or in parallel may depend on the configuration of the first network device, the configuration of the second network device, quality-of-service specifications, and/or the type of application. For example, if the first network device is transmitting video stream packets to the second network device, the tone map estimation unit 114 may refine the tone maps for the communication regions 404 and 408 consecutively to minimize disruption to the transmission of the video stream packets. As another example, the tone map estimation unit 114 may refine the tone maps for the communication regions 404 and 408 in parallel if the first and the second network devices do not have stringent QoS specifications.

If the tone map estimation unit 114 determines to modify the tone maps for the communication regions 404 and 408 consecutively, the tone map estimation unit 114 may determine the sequence in which the existing tone maps associated with the communication regions 404 and 408 should be invalidated. In some embodiments, the refined tone map may be determined for the communication region associated with the least preferred performance measurement. For example, the refined tone map may first be determined for the communication region associated with a lowest average SNR. As another example, the refined tone map may first be determined for the communication region associated with a highest frame error rate or a highest bit error rate. The tone map estimation unit 114 can notify the second network device to re-transmit the sounding messages in the communication regions 404 and 408 and to continue transmitting data packets in the remaining communication regions. The flow continues at block 518.

At block 518, the first network device receives sounding messages in the first communication region and receives data packets in the remaining communication regions. As described above in FIG. 4, after transmitting the notification 424 to refine the tone map for the first communication region 404, the tone map estimation unit 114 may receive the non-beamformed first set of sounding messages 426A-426E in the first communication region 404. As discussed above, the non-beamformed sounding messages 426A-426E may be generated without any beamforming parameters. The tone map estimation unit 114 may determine refined beamforming parameters for the first communication region 404, and transmit the refined beamforming parameters to the second network device. The tone map estimation unit 114 may receive the second set of sounding messages 430A-430E that were generated using the refined beamforming parameters. The tone map estimation unit 114 may determine refined bit loading information for the first communication region 404, and transmit the refined bit loading information to the second network device. Furthermore, as depicted in FIG. 4, when the tone map estimation unit 114 determines to refine the tone map of the first communication region 404, the tone map estimation unit 114 may only receive sounding messages in the first communication region 404. The first network device may continue to receive data packets in the remaining communication regions 406-412 that are generated in accordance with the respective existing tone maps. More generally, the first network device may receive the sounding messages in all the communication regions associated with invalidated tone maps. In each of the remaining communication regions, the first network device may receive data packets that are generated using the most recent tone map associated with the communication region. The flow continues at block 520.

At block 520, the first network device determines and provides refined beamforming parameters and refined bit loading information for the first communication region based, at least in part, on the sounding messages received in the first communication region. After the tone map estimation unit 114 provides the refined tone map for the first communication region 404 to the second network device, the second network device may use the refined tone map to transmit subsequent data packets 434A and 434B in the first communication region 404. In some embodiments, if another communication region with a performance measurement that is not in accordance with the performance measurement threshold was identified, the tone map estimation unit 114 may invalidate the current tone map of the next communication region. The tone map estimation unit 114 may cause the second network device to retransmit the sounding messages in the next communication region and to continue transmitting data packets in the remaining communication regions. It is noted that the first network device may continue to refine the tone maps for each communication region until each communication region is in accordance with the performance measurement thresholds. From block 520, the flow loops back to block 512 where the first network device monitors the performance measurement associated with each communication region.

Figure 7:
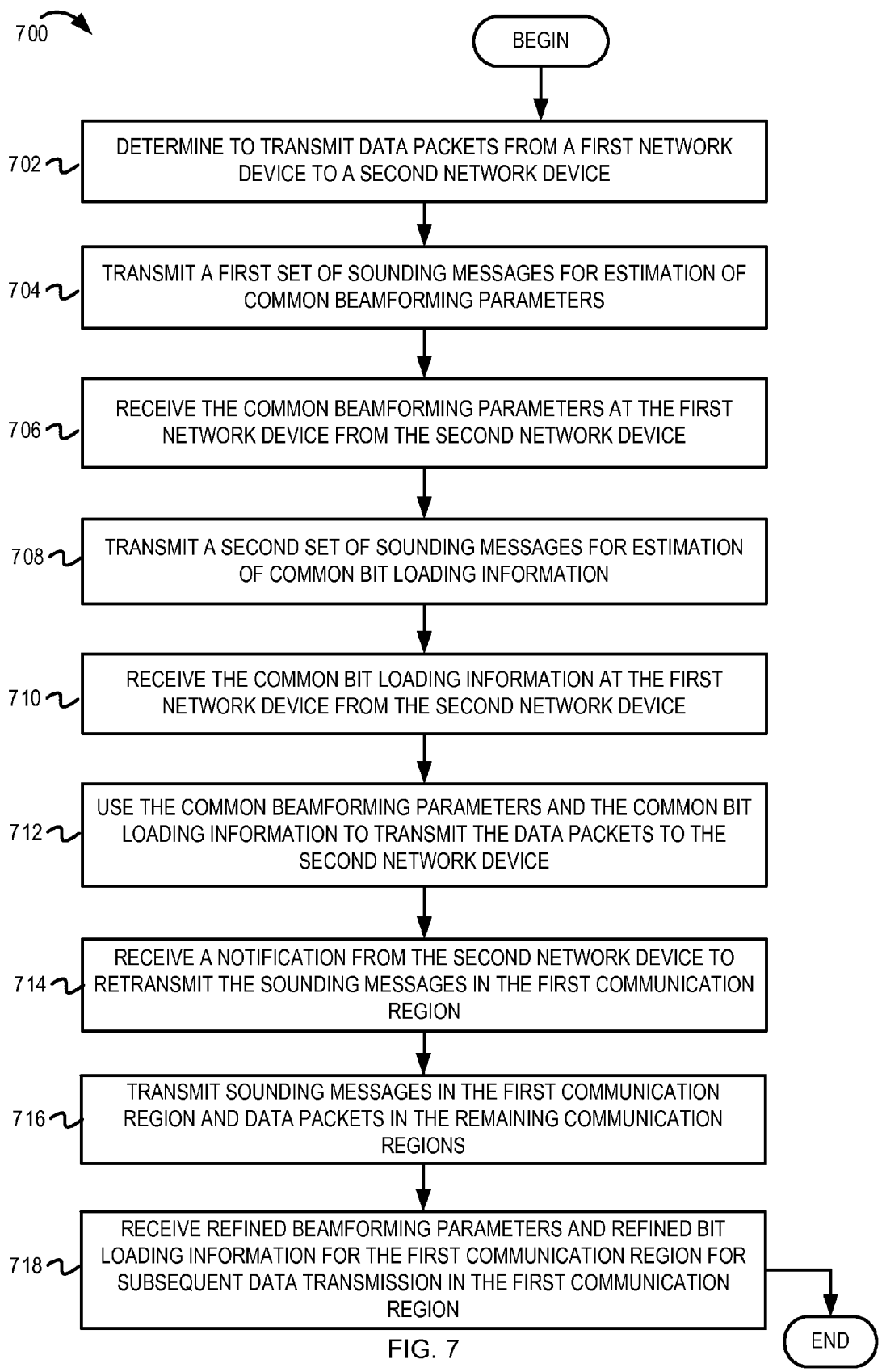
FIG. 7 is a flow diagram illustrating example operations of a transmitting PLC device for estimating a tone map in a PLC network.

FIG. 7 is a flow diagram 700 illustrating example operations of a transmitting PLC device for estimating a tone map in a PLC network. The flow 700 begins at block 702.

At block 702, a first network device determines to transmit data packets to a second network device of a communication network. With reference to the example of FIG. 1, the network device 102 may determine to transmit application data to the network device 104. In some embodiments, the first network device and the second network device may each be PLC-capable devices that implement PLC protocols (e.g., HomePlug AV/AV2/GreenPHY, IEEE 1905). In other embodiments, the first network device and the second network device may be configured to implement other suitable wired communication protocols (e.g., Ethernet, MoCA, etc.) and/or wireless communication protocols (e.g., WLAN). The flow continues at block 704.

At block 704, the first network device transmits a first set of sounding messages to enable the second network device to estimate common beamforming parameters. For example, the packet generation unit 108 of the network device 102 may generate the first set of non-beamformed sounding messages without applying any beamforming parameters to a predefined training sequence. In some embodiments, the predefined training sequence that is transmitted in the first set of sounding messages may be based on the communication protocol being implemented at the first network device and the second network device. In some embodiments, the first network device may transmit a predetermined number of sounding messages to the second network device. In another embodiment, the first network device and the second network device may negotiate to determine how many sounding messages should be transmitted in the first set of sounding messages. Referring to the example of FIG. 4, the front-end transceiver unit 106 may transmit the first set of sounding messages 414 to the second network device. The flow continues at block 706.

At block 706, the common beamforming parameters are received at the first network device from the second network device. For example, the front-end transceiver unit 106 may receive the common beamforming parameters from the second network device. The second network device may estimate the common beamforming parameters from the first set of sounding messages, as described above with reference to FIGS. 3-6. In some embodiments, the first network device may receive the common beamforming parameters in a management message (MME) 416 from the second network device. For each communication sub-carrier, the beamforming parameters may include weighting factors that should be applied to each data stream subsequently transmitted from the first network device. In some embodiments, the front-end transceiver unit 106 may receive beamforming matrices for each communication sub-carrier that may be used across all the communication regions. In other embodiments, the front-end transceiver unit 106 may receive beamforming angles for each communication sub-carrier that may be used across all the communication regions. The flow continues at block 708.

At block 708, the first network device transmits a second set of sounding messages to enable the second network device to estimate common bit loading information. For example, the packet generation unit 108 may generate the second set of sounding messages. The second set of sounding messages may be beamformed sounding messages including predefined data. The packet generation unit 108 may apply the common beamforming parameters to the predefined data to generate the second set of sounding messages. In some embodiments, the first network device may transmit a predetermined number of sounding messages to the second network device. In another embodiment, the first network device and the second network device may negotiate to determine how many sounding messages should be transmitted in the second set of sounding messages. Referring to the example of FIG. 4, the front-end transceiver unit 106 may transmit the second set of sounding messages 418 to the second network device. The flow continues at block 710.

At block 710, the common bit loading information is received at the first network device from the second network device. For example, the front-end transceiver unit 106 may receive the common bit loading information from the second network device. The second network device may estimate the common bit loading information from the second set of sounding messages, as described above with reference to FIGS. 3-6. In some embodiments, the first network device may receive the common bit loading information in a management message (MME) 420 from the second network device. For each data stream subsequently transmitted from the first network device, the bit loading information may indicate how many data bits should be mapped to each communication sub-carrier of the data stream. The flow continues at block 712.

At block 712, the first network device uses the common beamforming parameters and the common bit loading information to transmit the data packets to the second network device. For example, the packet generation unit 108 may generate the data packets using the common tone map. As described above, the second network device determines the common tone map across a plurality of communication regions 404-412 that constitute each powerline cycle. Estimating the common tone map can enable the first network device to start transmitting application data packets earlier and with a low latency. The packet generation unit 108 may distribute input data bits across multiple communication sub-carriers in accordance with the common bit loading information. The packet generation unit 108 may further combine the common beamforming parameters with the input data bits (or data symbols) to generate the data packets. Referring to the example of FIG. 4, the front-end transceiver unit 106 may transmit the data packets 422 using the common tone map to the second network device. The flow continues at block 714.

At block 714, the first network device receives a notification from the second network device to retransmit the sounding messages in a first communication region. As described above with reference to FIGS. 3-6, the second network device may determine whether to refine the tone map associated with any of the communication regions based, at least in part, on data packets transmitted during the corresponding communication region. In the example of FIG. 4, the first network device receives a notification 424 indicating that the first network device should retransmit the sounding messages in the communication region 404. The notification 424 can indicate that the performance measurement of the communication region 404 is not in accordance with the performance measurement threshold. The notification 424 may also indicate that the common tone map is invalidated in the communication region 404 but is still valid in the remaining communication regions 406-412. The flow continues at block 716.

At block 716, the first network device transmits sounding messages in the first communication region and data packets in the remaining communication regions. As depicted in FIG. 4, in response to receiving the notification 424, the first network device may transmit the non-beamformed first set of sounding messages 426A-426E in the communication region 404. The first network device may continue to transmit the data packets using the common tone map in the remaining communication regions 406-412. This can allow the first and the second network devices to continue to exchange application data while estimating the tone map for the communication regions that do not meet the performance measurement thresholds. For example, if the first network device is transmitting video stream packets to the second network device, the first network device may transmit the sounding messages in the first communication region 404 and may continue to transmit video stream packets in the remaining communication regions 406-412. More generally, the second network device may invalidate the tone maps associated with one or more communication regions. The first network device may transmit the sounding messages in the communication regions associated with the invalidated tone maps. For each of the remaining communication regions, the first network device may continue transmitting data packets generated using the most recent tone map associated with the communication region. The flow continues at block 718.

At block 718, the first network device receives refined beamforming parameters and refined bit loading information for subsequent data transmission in the first communication region. The first network device and the second network device may execute similar operations as described above in blocks 704-710 to determine the refined beamforming parameters and the refined bit loading information for the first communication region. The first network device may then transmit the data packets using the refined tone map in the first communication region and may transmit the data packets using the common tone map in the remaining communication regions. From block 716, the flow ends. Although FIG. 7 depicts the flow 700 ending after block 718, embodiments are not so limited. In other embodiments, the first network device may continue transmitting data packets in each communication region using the most recent tone map associated with each communication region. If the first network device receives another notification from the second network device identifying a communication region that should be re-evaluated, the first network device can retransmit the sounding messages in the identified communication region and transmit the data packets in the remaining communication regions using the corresponding most recent tone map.

It should be understood that FIGS. 1-7 are examples meant to aid in understanding embodiments and should not be used to limit embodiments or limit scope of the claims. Embodiments may comprise additional components, different components, and/or may perform additional operations, fewer operations, operations in a different order, operations in parallel, and some operations differently. For example, the Figures describe the receiving PLC device (e.g., the network device 104) analyzing the performance measurements for each communication region and determining whether to refine the tone map associated with a communication region. In other embodiments, the transmitting PLC device (e.g., the network device 102) may determine whether to refine the tone map associated with a communication region. For example, the network device 102 may assume a reciprocal PLC channel and may determine the performance measurements of each communication region based, at least in part, on messages (e.g., acknowledgement messages) received from the network device 104. The network device 102 may retransmit the sounding messages in a particular communication region if the performance measurements associated with the communication region are not in accordance with corresponding performance measurement thresholds, as described above with reference to FIGS. 3-7. In another embodiment, the network device 102 may keep track of the number of retransmission requests received per communication region. If the number of retransmission requests received for data packets transmitted in the first communication regions exceeds a threshold number, the network device 102 may infer that the tone map associated with the first communication region should be re-estimated. The network device 102 may then transmit sounding messages in the first communication region and may continue to transmit the data packets in the remaining communication regions. In some embodiments, prior to transmitting the sounding messages in the first communication region, the network device 102 may transmit a notification to the network device 104 indicating that the network device 102 will re-start the sounding process for estimating the tone map in the first communication region.

In some embodiments, the performance measurement threshold (described above in FIGS. 3-6) may depend on a preferred performance range of a performance parameter. Depending on the performance parameter, the performance measurement threshold may be selected as an upper limit or a lower limit of the preferred performance range. For example, the performance parameter may be an SNR and the preferred performance range may be 50 dB-100 dB. In this example, the SNR threshold may be selected as the lower limit of the preferred performance range (e.g., 50 dB). As another example, the performance parameter may be an attenuation level and the preferred performance range may be 2 dB-10 dB. In this example, the attenuation threshold may be selected as the upper limit of the preferred performance range (e.g., 10 dB). In some embodiments, the performance measurement threshold may be determined as a percentage of the upper limit or lower limit of the preferred performance range of the performance parameter. For example, the performance parameter may be an SNR and the preferred performance range may be 50 dB-100 dB. In this example, the SNR threshold may be selected as a percentage of the lower limit of the preferred performance range (e.g., 95% of 50 dB=47.5 dB). In other embodiments, other suitable techniques may be used to select the performance measurement threshold.

FIGS. 1-7 describe operations for estimating the tone map in a two stage sounding process—a first stage for estimating the beamforming parameters using non-beamformed sounding messages and a second stage for estimating the bit loading information using beamformed sounding messages. In other embodiments, the tone map may be estimated in a single stage sounding process. In this embodiment, the transmitting PLC device may transmit a predetermined number of non-beamformed sounding messages. In addition to estimating the common beamforming parameters from the received sounding messages, the receiving PLC device may also determine the performance measurements associated with the received sounding messages. The receiving PLC device may use the common beamforming parameters and the performance measurements to estimate how applying the common beamforming parameters to the sounding messages will change the performance measurements. More specifically, the receiving PLC device can estimate new performance measurements that will result from beamforming the sounding messages using the common beamforming parameters. The receiving PLC device may estimate the common bit loading information based, at least in part, on the estimated new performance measurements. The receiving PLC device may transmit the common beamforming parameters and the common bit loading information to the transmitting PLC device.

In some embodiments, the transmitting PLC device and the receiving PLC device may each be preconfigured (and, in some cases, configurable) to use either the single stage sounding process or the two stage sounding process to estimate the tone map. In other embodiments, the transmitting PLC device and the receiving PLC device may include functionality for both the single stage sounding process and the two stage sounding process. In one example of this embodiment, the transmitting PLC device and receiving PLC device may exchange handshake messages to negotiate whether to use the single stage sounding process or the two stage sounding process. In another example of this embodiment, the receiving PLC device may notify the transmitting PLC device regarding whether to use the single stage sounding process or the two stage sounding process.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more non-transitory computer readable medium(s) may be utilized. Non-transitory computer-readable media comprise all computer-readable media, with the sole exception being a transitory, propagating signal. The non-transitory computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code embodied on a computer readable medium for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
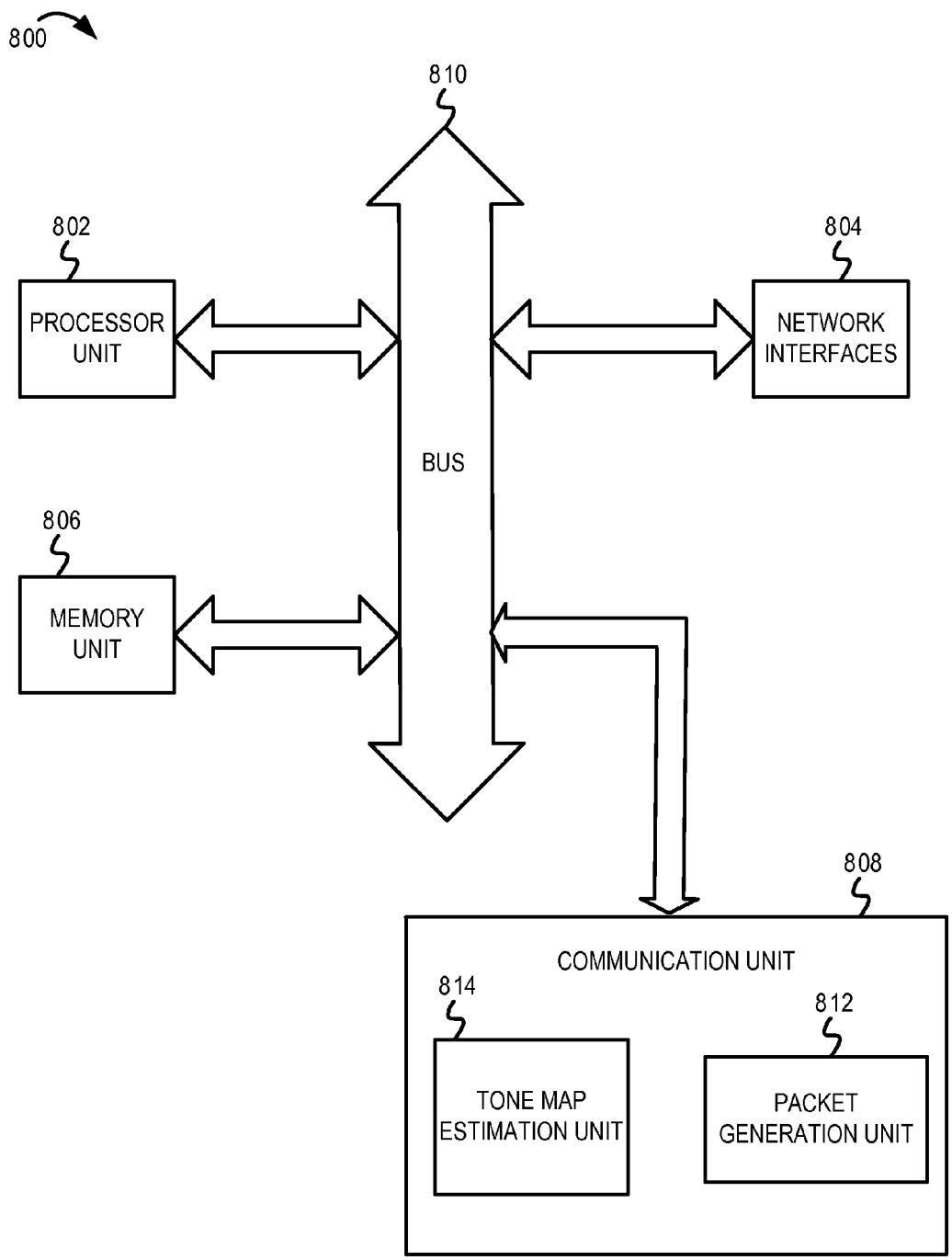
FIG. 8 is a block diagram of one embodiment of an electronic device including a mechanism for estimating a tone map in a PLC network.

FIG. 8 is a block diagram of one embodiment of an electronic device 800 including a mechanism for estimating a tone map in a communication network. In some implementations, the electronic device 800 may be one of a desktop computer, laptop computer, a tablet computer, a smart appliance, a gaming console, a television, a set top box, a media player, a PLC-capable device, or another electronic device including communication capabilities. The electronic device 800 includes a processor unit 802 (possibly including multiple processors, multiple cores, multiple nodes, and/or implementing multi-threading, etc.). The electronic device 800 includes a memory unit 806. The memory unit 806 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of non-transitory machine-readable storage media. The electronic device 800 also includes a bus 810 (e.g., PCI, ISA, PCI-Express, HyperTransport®, InfiniBand®, NuBus, AHB, AXI, etc.). The electronic device 800 also includes a network interface 804 that include a wireless network interface (e.g., a WLAN interface, a Bluetooth® interface, a WiMAX interface, a ZigBee® interface, a Wireless USB interface, etc.) and/or a wired network interface (e.g., a PLC interface, an Ethernet interface, etc.). Furthermore, in some embodiments, the electronic device 800 can execute an IEEE Std. 1905.1 protocol for implementing hybrid communication functionality.

The electronic device 800 also includes a communication unit 808. The communication unit 808 includes a packet generation unit 812 and a tone map estimation unit 814. The packet generation unit 812 can generate sounding messages and data packets using the appropriate tone maps for transmission to a receiving network device, as described above with reference to FIGS. 1-2, 4, and 7. The tone map estimation unit 814 can estimate a common tone map for multiple communication regions of the powerline cycle based on the received sounding messages. The tone map estimation unit 814 may determine performance measurements associated with each of the communication regions. The tone map estimation unit 814 may identify the communication regions with performance measurements that are not in accordance with performance measurement thresholds and may further refine the tone maps of the identified communication regions. Operations of the tone map estimation unit 814 determining the tone map for the communication regions were described above with reference to FIGS. 1-6.

Any one of these functionalities may be partially (or entirely) implemented in hardware and/or on the processor unit 802. For example, the functionality may be implemented with an application specific integrated circuit, in logic implemented in the processor unit 802, in a co-processor on a peripheral device or card, etc. In some embodiments, the communication unit 808 can each be implemented on a system-on-a-chip (SoC), an application specific integrated circuit (ASIC), or another suitable integrated circuit to enable communications of the electronic device 800. In some embodiments, the communication unit 808 may include additional processors and memory, and may be implemented in one or more integrated circuits on one or more circuit boards of the electronic device 800. Further, realizations may include fewer or additional components not illustrated in FIG. 8 (e.g., video cards, audio cards, additional network interfaces, peripheral devices, etc.). For example, in addition to the processor unit 802 coupled with the bus 810, the communication unit 808 may include at least one additional processor unit. As another example, although illustrated as being coupled to the bus 810, the memory unit 806 may be coupled to the processor unit 802. As another example, the electronic device 800 may include one or more radio transceivers, processors, memory, and other logic to implement the communication protocols and related functionality.

While the embodiments are described with reference to various implementations and exploitations, it will be understood that these embodiments are illustrative and that the scope of the inventive subject matter is not limited to them. In general, techniques for estimating tone maps in a communication network as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for network communication, the method comprising:
   determining, at a first network device, a common tone map for transmitting data during a plurality of communication regions of a powerline cycle based, at least in part, on a plurality of sounding messages received from a second network device;
   receiving, at the first network device, a first data packet from the second network device, wherein the first data packet is transmitted during a first communication region of the powerline cycle using the common tone map; and
   determining to modify the common tone map for the first communication region based, at least in part, on a first performance measurement associated with the first data packet.

2. The method of claim 1, further comprising:
   transmitting a first modified tone map to the second network device, the first modified tone map for transmitting data during the first communication region and the common tone map for transmitting data during a remainder of the plurality of communication regions.

3. The method of claim 2, wherein the first modified tone map includes modified beamforming parameters and modified bit load information associated with the first communication region.

4. The method of claim 1, wherein said determining to modify the common tone map comprises determining a first modified tone map in response to the first performance measurement being less than a performance measurement threshold, the first modified tone map for transmitting data during the first communication region.

5. The method of claim 1, further comprising:
   notifying the second network device to
      transmit a first set of sounding messages during the first communication region, the first set of sounding messages used for determining a first modified tone map, the first modified tone map for transmitting data during the first communication region, and
      transmit data during a remainder of the plurality of communication regions using the common tone map.

6. The method of claim 1, wherein, in response to determining to modify the common tone map, further comprising:
   receiving, at the first network device, a first set of sounding messages during the first communication region from the second network device;
   determining modified beamforming parameters associated with the first communication region based, at least in part, on the first set of sounding messages; and
   transmitting the modified beamforming parameters from the first network device to the second network device during the first communication region.

7. The method of claim 6, wherein said receiving the first set of sounding messages during the first communication region further comprises:
   receiving data packets during a remainder of the plurality of communication regions, the data packets transmitted from the second network device using the common tone map.

8. The method of claim 6, further comprising:
   receiving, at the first network device, a second set of sounding messages during the first communication region from the second network device, wherein the second set of sounding messages is transmitted using the modified beamforming parameters;
   determining modified bit load information associated with the first communication region based, at least in part, on the second set of sounding messages, wherein a first modified tone map includes the modified beamforming parameters and the modified bit load information; and
   transmitting the modified bit load information from the first network device to the second network device during the first communication region.

9. The method of claim 6, further comprising:
   determining modified bit load information associated with the first communication region based, at least in part, on the first set of sounding messages and the modified beamforming parameters, wherein a first modified tone map includes the modified beamforming parameters and the modified bit load information; and
   transmitting the modified bit load information from the first network device to the second network device during the first communication region.

10. The method of claim 1, further comprising:
    receiving, at the first network device, a second data packet during the first communication region, the second data packet transmitted by the second network device using a first modified tone map associated with the first communication region; and
    receiving, at the first network device, a third data packet during a second communication region of the plurality of communication regions, the third data packet transmitted by the second network device using the common tone map.

11. The method of claim 10, further comprising:
    evaluating the second data packet to determine whether to modify the first modified tone map.

12. The method of claim 1, further comprising:
determining that the first performance measurement and a second performance measurement associated with a second data packet received during a second communication region are less than a performance measurement threshold; and
determining a first modified tone map for the first communication region prior to determining a second modified tone map for the second communication region.

13. The method of claim 1, further comprising:
determining that the first performance measurement and a second performance measurement associated with a second data packet received during a second communication region are less than a performance measurement threshold; and
determining a first modified tone map for the first communication region and a second modified tone map for the second communication region concurrently.

14. The method of claim 1, wherein said determining to modify the common tone map comprises:
determining the first performance measurement based, at least in part, on the first data packet and one or more additional data packets received during the first communication region; and
comparing the first performance measurement with a performance measurement threshold.

15. The method of claim 1, wherein determining to modify the common tone map comprises determining a first modified tone map, wherein the first modified tone map includes:
beamforming parameters associated with a plurality of communication sub-carriers of one or more data streams transmitted during the first communication region, and
bit loading information associated with the plurality of communication sub-carriers.

16. A method for network communication, the method comprising:
transmitting, from a first network device, a plurality of sounding messages during a plurality of communication regions of a powerline cycle to a second network device;
receiving a common tone map at the first network device from the second network device, the common tone map for transmitting data during the plurality of communication regions, wherein the common tone map is determined by the second network device based, at least in part, on the plurality of sounding messages;
transmitting, from the first network device, a first data packet during a first communication region of the powerline cycle using the common tone map;
receiving a first modified tone map for the first communication region from the second network device; and
transmitting, from the first network device, one or more data packets in the first communication region using the first modified tone map and transmitting one or more data packets during a remainder of the plurality of communication regions using the common tone map.

17. The method of claim 16, further comprising:
receiving a notification from the second network device to transmit a first set of sounding messages during the first communication region; and
transmitting, from the first network device, the first set of sounding messages during the first communication region and transmitting the one or more data packets during the remainder of the plurality of communication regions, wherein the first modified tone map is determined by the second network device based, at least in part, on the first set of sounding messages.

18. The method of claim 16, further comprising:
generating, using the common tone map, one or more data packets for transmission during the plurality of communication regions in response to receiving the common tone map from the second network device.

19. A first network device comprising:
a memory; and
a processor coupled with the memory, the processor configured to execute instructions stored in the memory to cause the first network device to:
determine a common tone map for transmitting data during a plurality of communication regions of a powerline cycle based, at least in part, on a plurality of sounding messages received from a second network device;
receive a first data packet from the second network device, wherein the first data packet is transmitted during a first communication region of the powerline cycle using the common tone map; and
determine to modify the common tone map for the first communication region based, at least in part, on a first performance measurement associated with the first data packet.

20. The first network device of claim 19, wherein the instructions further cause the first network device to:
transmit a first modified tone map to the second network device, the first modified tone map for transmitting data during the first communication region and the common tone map for transmitting data during a remainder of the plurality of communication regions.

21. The first network device of claim 19, wherein the instructions further cause the first network device to:
notify the second network device to
transmit a first set of sounding messages during the first communication region, the first set of sounding messages used for determining a first modified tone map, the first modified tone map for transmitting data during the first communication region, and
transmit data during a remainder of the plurality of communication regions using the common tone map.

22. The first network device of claim 19, wherein the instructions further cause the first network device to:
receive a second data packet during the first communication region, the second data packet transmitted by the second network device using a first modified tone map associated with the first communication region; and
receive a third data packet during a second communication region of the plurality of communication regions, the third data packet transmitted by the second network device using the common tone map.

23. The first network device of claim 22, wherein the instructions further cause the first network device to:
evaluate the second data packet to determine whether to modify the first modified tone map.

24. The first network device of claim 19, wherein the instructions further cause the first network device to:
determine that the first performance measurement and a second performance measurement associated with a second data packet received during a second communication region are less than a performance measurement threshold; and
determine a first modified tone map for the first communication region prior to determining a second modified tone map for the second communication region.

25. The first network device of claim 19, wherein the instructions further cause the first network device to:

determine the first performance measurement based, at least in part, on the first data packet and one or more additional data packets received during the first communication region; and compare the first performance measurement with a performance measurement threshold to determine to modify the common tone map.

26. A non-transitory machine-readable storage medium having machine executable instructions stored therein, the machine executable instructions comprising instructions to:

determine, at a first network device, a common tone map for transmitting data during a plurality of communication regions of a powerline cycle based, at least in part, on a plurality of sounding messages received from a second network device;

receive, at the first network device, a first data packet from the second network device, wherein the first data packet is transmitted during a first communication region of the powerline cycle using the common tone map; and determine to modify the common tone map for the first communication region based, at least in part, on a first performance measurement associated with the first data packet.

27. The non-transitory machine-readable storage medium of claim 26, wherein said instructions further comprise instructions to:

transmit a first modified tone map to the second network device, the first modified tone map for transmitting data during the first communication region and the common tone map for transmitting data during a remainder of the plurality of communication regions.

28. The non-transitory machine-readable storage medium of claim 26, wherein said instructions further comprise instructions to:

notify the second network device to
transmit a first set of sounding messages during the first communication region, the first set of sounding messages used for determining a first modified tone map, the first modified tone map for transmitting data during the first communication region, and
transmit data during a remainder of the plurality of communication regions using the common tone map.

29. The non-transitory machine-readable storage medium of claim 26, wherein said instructions further comprise instructions to:

receive, at the first network device, a second data packet during the first communication region, the second data packet transmitted by the second network device using a first modified tone map associated with the first communication region; and receive, at the first network device, a third data packet during a second communication region of the plurality of communication regions, the third data packet transmitted by the second network device using the common tone map.

30. The non-transitory machine-readable storage medium of claim 29, wherein said instructions further comprise instructions to:

evaluate the second data packet to determine whether to modify the first modified tone map.

* * * * *